US012807262B2

(12) United States Patent
Lovold et al.

(10) Patent No.: US 12,807,262 B2
(45) Date of Patent: Nov. 24, 2026

(54) ALL-TERRAIN VEHICLE

(71) Applicant: Polaris Industries Inc., Medina, MN (US)

(72) Inventors: Ryan K. Lovold, Roseau, MN (US); Cameron Fisher, Plymouth, MN (US); Thomas C. Hanegraaf, Delano, MN (US)

(73) Assignee: POLARIS INDUSTRIES INC., Medina, MN (US)

( * ) Notice: Subject to any disclaimer, the term of this patent is extended or adjusted under 35 U.S.C. 154(b) by 0 days.

(21) Appl. No.: 18/588,235

(22) Filed: Feb. 27, 2024

(65) Prior Publication Data

US 2024/0262450 A1 Aug. 8, 2024

Related U.S. Application Data

(60) Continuation of application No. 16/784,642, filed on Feb. 7, 2020, now Pat. No. 11,945,540, which is a
(Continued)

(51) Int. Cl.
*B62K 5/00* (2013.01)
*B60K 11/08* (2006.01)
(Continued)

(52) U.S. Cl.
CPC ................ *B62K 5/00* (2013.01); *B60K 11/08* (2013.01); *B60K 15/063* (2013.01); *B60R 5/04* (2013.01);
(Continued)

(58) Field of Classification Search
CPC ............ B62K 5/00; B62K 5/007; B62K 5/01; B62K 5/027; B60K 15/063; B60R 5/04
See application file for complete search history.

(56) References Cited

U.S. PATENT DOCUMENTS 4,744,432 A 5/1988 Shibata et al.
4,781,258 A 11/1988 Tamura
(Continued)

FOREIGN PATENT DOCUMENTS

CN 2433108 Y 6/2001
CN 1605535 A 4/2005
(Continued)

OTHER PUBLICATIONS

International Preliminary Report on Patentability received for PCT Patent Application No. PCT/US2017/041135, mailed on Oct. 5, 2018, 37 pages.
International Search Report and Written Opinion issued by the International Searching Authority, dated Dec. 1, 2017, for International Patent Application No. PCT/US2017/041135; 23 pages.
(Continued)

*Primary Examiner* — Minnah L Seoh
(74) *Attorney, Agent, or Firm* — SCHWEGMAN LUNDBERG & WOESSNER, P.A.

(57) ABSTRACT

An all-terrain vehicle includes a frame assembly having a rear rack frame with at least one tie-down bar coupled to the rear rack frame, a plurality of body panels supported by the frame assembly including a fender body panel having an upstanding wall with a thickness defining at least one fender opening, and a rear rack supported by the rear rack frame. The at least one tie-down bar of the rear rack frame may be aligned with the at least one fender opening of the fender body panel.

19 Claims, 20 Drawing Sheets

Related U.S. Application Data division of application No. 15/205,601, filed on Jul. 8, 2016, now Pat. No. 10,569,819.

(51) Int. Cl.
*B60K 15/063* (2006.01)
*B60R 5/04* (2006.01)
*B62J 17/10* (2020.01)
*B62K 5/007* (2013.01)
*B62K 5/01* (2013.01)

(52) U.S. Cl.
CPC ............... *B62J 17/10* (2020.02); *B62K 5/007* (2013.01); *B62K 5/01* (2013.01); *B60K 2015/0637* (2013.01)

(56) References Cited

U.S. PATENT DOCUMENTS

| | | | |
|---|---|---|---|
| 4,787,470 A | 11/1988 | Badsey | |
| 4,830,135 A | 5/1989 | Yamashita | |
| 4,905,857 A | 3/1990 | Her | |
| 4,964,484 A | 10/1990 | Buell | |
| 5,076,387 A | 12/1991 | Oka | |
| 5,083,632 A | 1/1992 | Saito et al. | |
| 5,447,354 A * | 9/1995 | Delp | A23D 7/013 D34/27 |
| D374,416 S | 10/1996 | Miyamoto et al. | |
| 5,601,206 A | 2/1997 | Haas et al. | |
| 5,738,471 A | 4/1998 | Zentner | |
| 5,797,167 A * | 8/1998 | Schwab | F16G 11/143 24/16 R |
| 6,059,141 A | 5/2000 | Wojnowski | |
| 6,113,328 A | 9/2000 | Claucherty | |
| 6,209,941 B1 | 4/2001 | Cross | |
| 6,340,186 B2 | 1/2002 | Johnson et al. | |
| 6,524,056 B1 * | 2/2003 | Kloster | B60P 3/122 414/571 |
| 6,582,004 B1 | 6/2003 | Hamm | |
| 6,626,260 B2 | 9/2003 | Gagnon et al. | |
| 6,705,680 B2 | 3/2004 | Bombardier | |
| 6,719,346 B2 | 4/2004 | Bettin et al. | |
| 6,732,830 B2 | 5/2004 | Gagnon et al. | |
| 6,736,265 B2 | 5/2004 | Kipper et al. | |
| D501,570 S | 2/2005 | Tandrup et al. | |
| 6,874,590 B2 | 4/2005 | Rondeau et al. | |
| D513,718 S | 1/2006 | Itaya et al. | |
| D520,914 S | 5/2006 | Luh | |
| 7,044,527 B2 | 5/2006 | Maeda et al. | |
| D522,924 S | 6/2006 | Yokoyama et al. | |
| 7,055,454 B1 * | 6/2006 | Whiting | B62K 19/40 114/364 |
| 7,121,371 B2 | 10/2006 | Rondeau et al. | |
| 7,128,341 B1 | 10/2006 | Dahl et al. | |
| 7,134,702 B2 | 11/2006 | Takahashi et al. | |
| D539,705 S | 4/2007 | Ichikawa et al. | |
| D546,246 S | 7/2007 | Crepeau et al. | |
| 7,243,750 B2 | 7/2007 | Nakabayashi et al. | |
| 7,303,221 B2 | 12/2007 | Takahashi et al. | |
| D563,000 S | 2/2008 | Sanschagrin et al. | |
| 7,328,943 B2 | 2/2008 | Johnson et al. | |
| 7,331,418 B2 | 2/2008 | Audet | |
| 7,338,105 B2 | 3/2008 | Chung et al. | |
| 7,377,570 B2 | 5/2008 | Rondeau et al. | |
| 7,438,350 B1 | 10/2008 | Peterson et al. | |
| D585,792 S | 2/2009 | Chao et al. | |
| 7,506,712 B2 | 3/2009 | Kato et al. | |
| 7,510,199 B2 | 3/2009 | Nash et al. | |
| 7,530,629 B2 | 5/2009 | King et al. | |
| 7,537,499 B2 | 5/2009 | Davis et al. | |
| 7,591,503 B2 | 9/2009 | Schroeder et al. | |
| 7,597,387 B2 | 10/2009 | Hlopick et al. | |
| 7,644,791 B2 | 1/2010 | Davis et al. | |
| 7,647,996 B2 | 1/2010 | Maltais et al. | |
| 7,650,959 B2 | 1/2010 | Kato et al. | |
| 7,658,411 B2 | 2/2010 | Davis et al. | |
| 7,669,678 B2 | 3/2010 | Benedict et al. | |
| 7,686,365 B2 | 3/2010 | Thelen et al. | |
| 7,690,462 B2 | 4/2010 | Kato et al. | |
| 7,708,105 B1 | 5/2010 | Berg | |
| 7,710,236 B2 | 5/2010 | Jozwiak | |
| 7,735,896 B2 | 6/2010 | Kubota | |
| 7,743,864 B2 | 6/2010 | Tweet | |
| D620,399 S | 7/2010 | Wu et al. | |
| D628,520 S | 12/2010 | Lin | |
| D638,150 S | 5/2011 | Ichikawa et al. | |
| 7,942,447 B2 | 5/2011 | Davis et al. | |
| 7,954,853 B2 | 6/2011 | Davis et al. | |
| D643,781 S | 8/2011 | Nagao et al. | |
| 8,006,792 B2 | 8/2011 | Nakao et al. | |
| 8,025,326 B2 | 9/2011 | Ostroski et al. | |
| 8,109,556 B2 | 2/2012 | Bergman et al. | |
| 8,191,677 B2 | 6/2012 | Davis et al. | |
| 8,191,929 B2 | 6/2012 | Davis et al. | |
| 8,191,930 B2 | 6/2012 | Davis et al. | |
| 8,196,692 B2 | 6/2012 | Davis et al. | |
| 8,225,897 B1 | 7/2012 | Hollingsworth | |
| 8,251,268 B2 | 8/2012 | Hanafusa et al. | |
| 8,297,394 B2 | 10/2012 | Davis et al. | |
| 8,313,133 B2 | 11/2012 | King | |
| 8,322,964 B2 | 12/2012 | George | |
| D680,468 S | 4/2013 | Li et al. | |
| 8,419,104 B2 | 4/2013 | Bergman et al. | |
| 8,573,671 B2 | 11/2013 | Watkins | |
| 8,622,428 B2 | 1/2014 | Davis et al. | |
| 8,641,117 B2 | 2/2014 | Abe et al. | |
| 8,646,668 B2 | 2/2014 | Oakes | |
| 8,672,387 B1 | 3/2014 | Kaku et al. | |
| 8,690,219 B1 * | 4/2014 | Calvert | B60P 3/40 296/3 |
| 8,783,720 B2 | 7/2014 | Davis et al. | |
| 8,844,999 B2 | 9/2014 | Bergman et al. | |
| 8,857,882 B2 | 10/2014 | Daniels, Jr. | |
| 8,905,435 B2 | 12/2014 | Ripley et al. | |
| D737,724 S | 9/2015 | Schroeder et al. | |
| 9,167,876 B2 | 10/2015 | Yamaguchi et al. | |
| D751,467 S | 3/2016 | Lai et al. | |
| D760,930 S | 7/2016 | Fisker | |
| D764,081 S | 8/2016 | Shibuta | |
| D796,096 S | 8/2017 | Rudwal et al. | |
| D796,097 S | 8/2017 | Rudwal et al. | |
| D805,224 S | 12/2017 | Eck et al. | |
| D827,500 S | 9/2018 | Lovold et al. | |
| D856,549 S | 8/2019 | Hu et al. | |
| D866,402 S | 11/2019 | Wang et al. | |
| 10,569,819 B2 | 2/2020 | Lovold et al. | |
| D904,227 S | 12/2020 | Bracy | |
| D913,847 S | 3/2021 | Hashimoto et al. | |
| D930,197 S | 9/2021 | Longpre et al. | |
| D930,862 S | 9/2021 | Gander et al. | |
| D934,118 S | 10/2021 | Schroeder et al. | |
| D935,945 S | 11/2021 | Bruderer et al. | |
| D937,710 S | 12/2021 | Dunn et al. | |
| D940,363 S | 1/2022 | Ye et al. | |
| D958,006 S | 7/2022 | Dunn et al. | |
| D962,823 S | 9/2022 | Dunn et al. | |
| D1,053,067 S | 12/2024 | Hung | |
| D1,056,772 S | 1/2025 | Xu et al. | |
| 2002/0027036 A1 | 3/2002 | Hori et al. | |
| 2002/0040822 A1 | 4/2002 | Gagnon et al. | |
| 2004/0112669 A1 | 6/2004 | Rondeau et al. | |
| 2005/0180835 A1 * | 8/2005 | Schneider | B60P 7/0823 410/100 |
| 2007/0085378 A1 * | 4/2007 | Hanson | B60R 13/01 296/183.1 |
| 2008/0164085 A1 | 7/2008 | Cecinini | |
| 2008/0277184 A1 | 11/2008 | Marleau | |
| 2008/0283326 A1 | 11/2008 | Bennett et al. | |
| 2009/0079254 A1 | 3/2009 | Jacobs | |
| 2009/0115229 A1 | 5/2009 | Messner et al. | |
| 2009/0195035 A1 | 8/2009 | Ripley | |
| 2010/0194088 A1 | 8/2010 | Davis et al. | |
| 2010/0301592 A1 * | 12/2010 | Longwell | B60R 9/06 280/769 |

(56) References Cited

U.S. PATENT DOCUMENTS

| | | | | |
|---|---|---|---|---|
| 2011/0031291 | A1 | 2/2011 | Oakes | |
| 2011/0108349 | A1 | 5/2011 | Mcclendon et al. | |
| 2011/0198830 | A1 | 8/2011 | Davis et al. | |
| 2012/0031688 | A1 | 2/2012 | Safranski et al. | |
| 2012/0086243 | A1 | 4/2012 | Daniels, Jr. | |
| 2012/0090908 | A1 | 4/2012 | Bergman et al. | |
| 2012/0235395 | A1 | 9/2012 | Davis et al. | |
| 2012/0256438 | A1 | 10/2012 | Watkins | |
| 2013/0026776 | A1 | 1/2013 | Abe et al. | |
| 2013/0153325 | A1 | 6/2013 | Bergman et al. | |
| 2014/0021232 | A1 | 1/2014 | Lazarevich et al. | |
| 2014/0265284 | A1 | 9/2014 | Davis et al. | |
| 2014/0375080 | A1 * | 12/2014 | Bermes | B60P 7/0807 296/186.5 |
| 2015/0047917 | A1 | 2/2015 | Burt, II et al. | |
| 2015/0197304 | A1 | 7/2015 | Kroening, Jr. | |
| 2016/0332536 | A1 | 11/2016 | Weber et al. | |
| 2017/0232905 | A1 * | 8/2017 | Jhant | B60R 9/06 296/192 |
| 2018/0009500 | A1 | 1/2018 | Lovold et al. | |
| 2020/0172190 | A1 | 6/2020 | Lovold | |

FOREIGN PATENT DOCUMENTS

| | | | |
|---|---|---|---|
| CN | 101249859 | A | 8/2008 |
| CN | 201102589 | Y | 8/2008 |
| CN | 101687527 | A | 3/2010 |
| CN | 103249578 | A | 8/2013 |
| CN | 203172806 | U | 9/2013 |
| CN | 204827001 | U | 12/2015 |
| CN | 105263794 | A | 1/2016 |
| EP | 1371520 | A2 | 12/2003 |
| EP | 1476347 | A1 | 11/2004 |
| EP | 1625995 | A1 | 2/2006 |
| JP | 2007-191104 | A | 8/2007 |
| WO | 03/70547 | A1 | 8/2003 |
| WO | 2018/009824 | A1 | 1/2018 |

OTHER PUBLICATIONS

Office Action issued by the Canadian Intellectual Property Office, dated Dec. 11, 2019, for Canadian Patent Applicalion No. 3,030,012; 5 pages.

“U.S. Appl. No. 29/964,972, Ex Parte Quayle Action mailed Oct. 6, 2025”, 8 pgs.

“U.S. Appl. No. 29/964,972, Preliminary Amendment filed Oct. 11, 2024”, 4 pgs.

“Canadian Application Serial No. 3,127,365, Office Action mailed Jun. 28, 2023”, 7 pgs.

“Canadian Application Serial No. 3,127,365, Office Action mailed Sep. 26, 2024”, 3 pgs.

“Canadian Application Serial No. 3,127,365, Office Action mailed Oct. 31, 2022”, 6 pgs.

“Canadian Application Serial No. 3,127,365, Response filed Jan. 13, 2025 to Office Action mailed Sep. 26, 2024”, 6 pgs.

“Canadian Application Serial No. 3,127,365, Response filed Feb. 27, 2023 to Office Action mailed Oct. 31, 2022”, 21 pgs.

“Canadian Application Serial No. 3,127,365, Response filed Oct. 28, 2023 to Office Action mailed Jun. 28, 2023”, 20 pgs.

“Canadian Application Serial No. 3,030,012, Examiners Rule 862 Report mailed Dec 11, 2019”, 5 pgs.

“Canadian Application Serial No. 3,030,012, Response filed Apr. 9, 2020 to Examiners Rule 862 Report mailed Dec. 11, 2019”, w English Claims, 19 pgs.

“U.S. Appl. No. 29/964,972, Notice of Allowance mailed May 27, 2026”, 8 pgs.

“U.S. Appl. No. 29/964,972, Response filed Apr. 6, 2026 to Ex Parte Quayle Action mailed Oct. 6, 2025”, 7 pgs.

“Chinese Application Serial No. 201780042076.2, Office Action mailed Feb. 3, 2020”, w/ English Translation, 22 pgs.

“Mexican Application Serial No. MX/a/2018/016278, Office Action mailed Mar. 27, 2023”, With English Machine Translation, 8 pgs.

“Mexican Application Serial No. MX/a/2022/015640, Office Action mailed Mar. 30, 2026”, With English Machine Translation, 10 pgs.

“Mexican Application Serial No. MX/a/2022/015641, Office Action mailed Mar. 30, 2026”, With English Machine Translation, 10 pgs.

“Mexican Application Serial No. MX/a/2022/015642, Office Action mailed Mar. 30, 2026”, With English Machine Translation, 11 pgs.

* cited by examiner

ALL-TERRAIN VEHICLE

CROSS-RELATED APPLICATIONS

The present application is a continuation of U.S. Patent Application Ser. No. 16/784,642, filed Feb. 7, 2020, which is a divisional of U.S. Patent Application Ser. No. 15/205,601, filed Jul. 8, 2016, the entire disclosures of which are incorporated herein.

BACKGROUND OF THE DISCLOSURE

The present disclosure generally relates to an all-terrain vehicle (ATV) and, more particularly, to an ATV having improved ergonomics and performance.

Generally, all-terrain vehicles (ATVs) are used to carry one or two passengers and a small amount of cargo over a variety of terrains. Due to increasing recreational interest in ATVs, specialty ATVs, such as those used for trail riding, racing, and cargo hauling have entered the market place. Most ATVs include an engine including between one and three cylinders. Most ATVs include a straddle or saddle type seat positioned above the engine. Examples of ATVs are disclosed in patent application Ser. No. 14/208,921 filed on Mar. 13, 2014; and/or in U.S. Pat. Nos. 8,122,993 and 8,215,694, the subject matter of which is incorporated herein by reference.

SUMMARY OF THE DISCLOSURE

In one aspect, an all-terrain vehicle comprises a longitudinally extending frame; front and rear ground engaging members coupled to and supporting the frame; a straddle seat coupled to the frame for supporting at least one rider; an engine positioned under the seat and coupled to the frame; a transmission drivingly coupled to the engine and drivingly coupled to the front and rear wheels; an exhaust system including an exhaust pipe extending from the engine and rearwardly to a position adjacent a rear of the frame; a foot pedestal positioned on left and right sides of the frame for placement of the rider's feet; a body panel enclosing each lateral side of the frame above the foot pedestal and below the seat; and an air ventilation system positioned adjacent a rearmost point of the front wheel and directing air rearwardly through the engine compartment.

In another aspect, an all-terrain vehicle comprises a longitudinally extending frame; front and rear ground engaging members coupled to and supporting the frame; a straddle seat coupled to the frame for supporting at least one rider; an engine positioned under the seat and coupled to the frame; a transmission drivingly coupled to the engine and drivingly coupled to the front and rear ground engaging members; a foot pedestal positioned on left and right sides of the frame for placement of the rider's feet; an air ventilation system positioned adjacent a rearmost point of the front ground engaging members and directing air rearwardly through the engine compartment, wherein the air ventilation system includes at least one air scoop adjacent a front of the vehicle for directing the air.

In another aspect, an all-terrain vehicle comprises a longitudinally extending frame; front and rear ground engaging members coupled to and supporting the frame; a straddle seat coupled to the frame for supporting at least one rider; an engine positioned under the seat and coupled to the frame; a rear rack positioned rearwardly of the straddle seat; and a storage bin integrally formed with the rear rack.

In another aspect, an all-terrain vehicle comprises a longitudinally extending frame; front and rear ground engaging members coupled to and supporting the frame; a straddle seat coupled to the frame for supporting at least one rider; an engine positioned under the seat and coupled to the frame; a rear rack positioned rearwardly of the straddle seat; a storage bin positioned within the rear rack; and a cover rotatably positioned over the storage bin, the cover conforming to the top surface of the rear rack and forming a load bearing surface.

In yet another aspect, an all-terrain vehicle comprises a longitudinally extending frame; front and rear ground engaging members coupled to and supporting the frame; a straddle seat coupled to the frame for supporting at least one rider; an engine positioned under the seat and coupled to the frame; a rear rack positioned rearwardly of the straddle seat; a storage bin positioned within the rear rack, the rear rack including a channel surrounding the storage bin; a seal positioned within the channel and surrounding the storage bin; and a cover rotatably positioned over the storage bin and contacting the seal when in a closed position, the cover having overstress protection when loaded.

DETAILED DESCRIPTION

Figure 1:
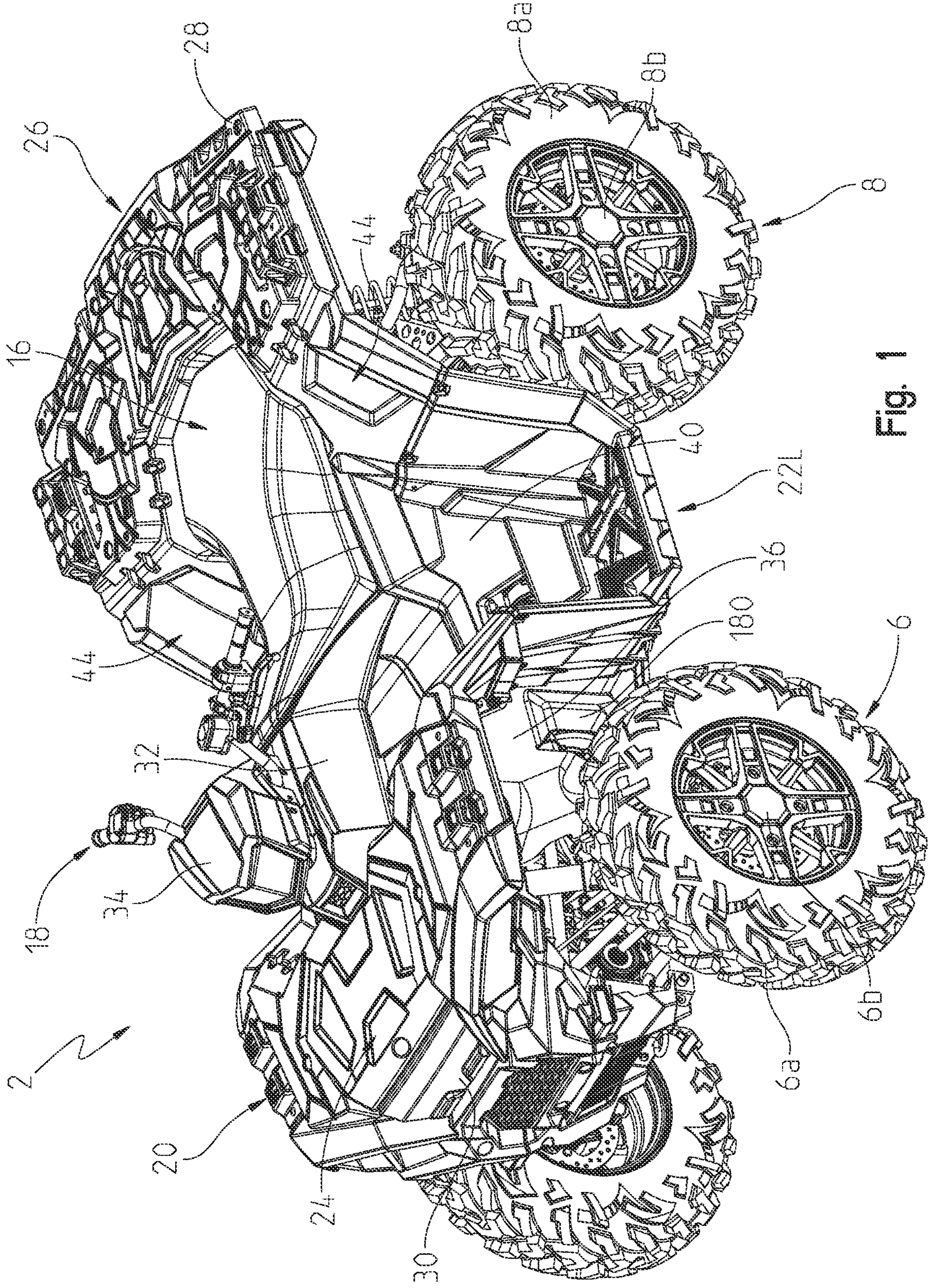
FIG. 1 is a left front perspective view of the all-terrain vehicle of the present application.

Corresponding reference characters indicate corresponding parts throughout the several views. Unless stated otherwise the drawings are proportional. The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to an ATV, it should be understood that the features disclosed herein may have application to other types of vehicles such as utility vehicles, motorcycles, watercraft, snowmobiles, people movers, and golf carts.

Figure 2:
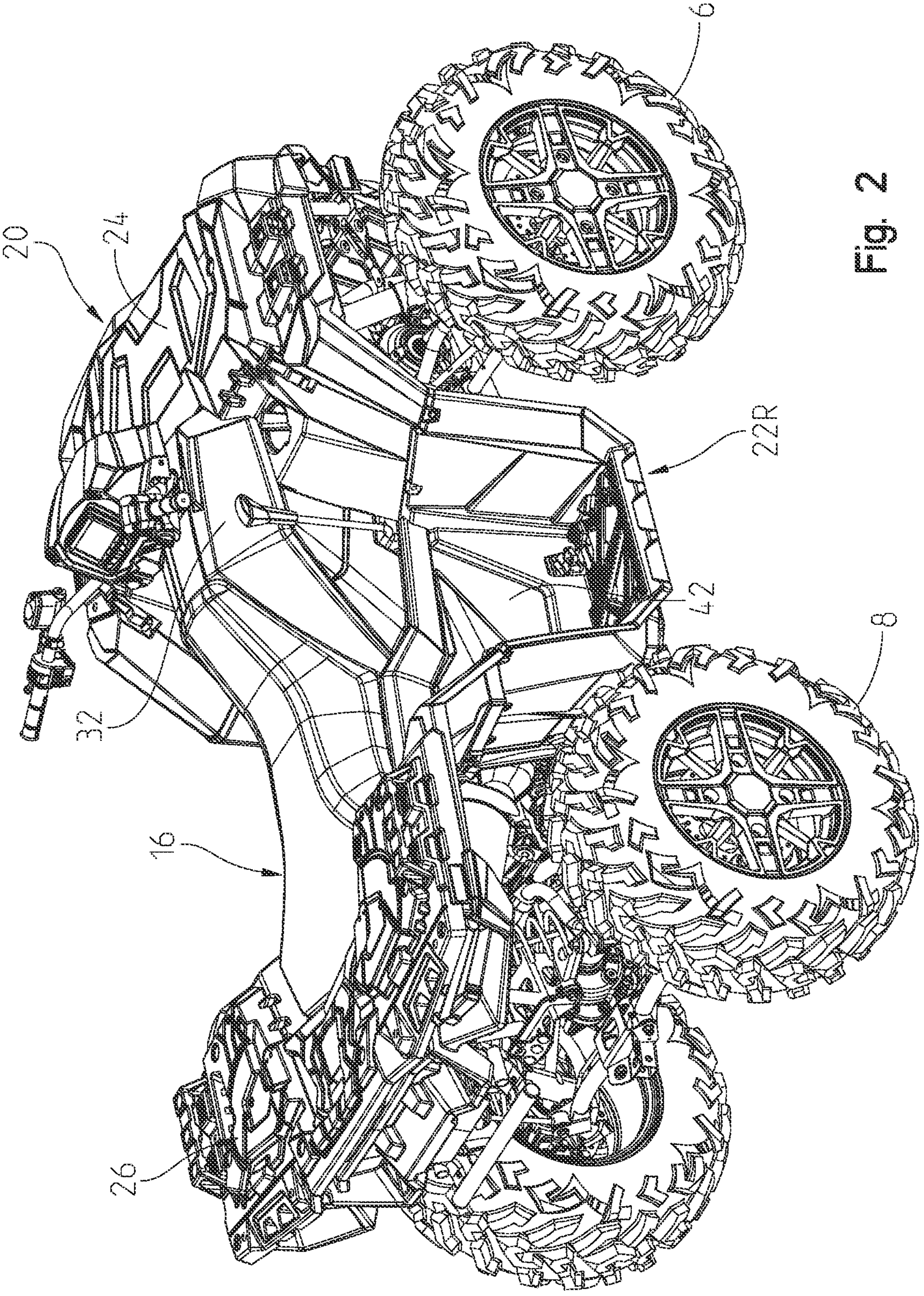
FIG. 2 is a right rear perspective view of the all-terrain vehicle of FIG. 1.
Figure 7:
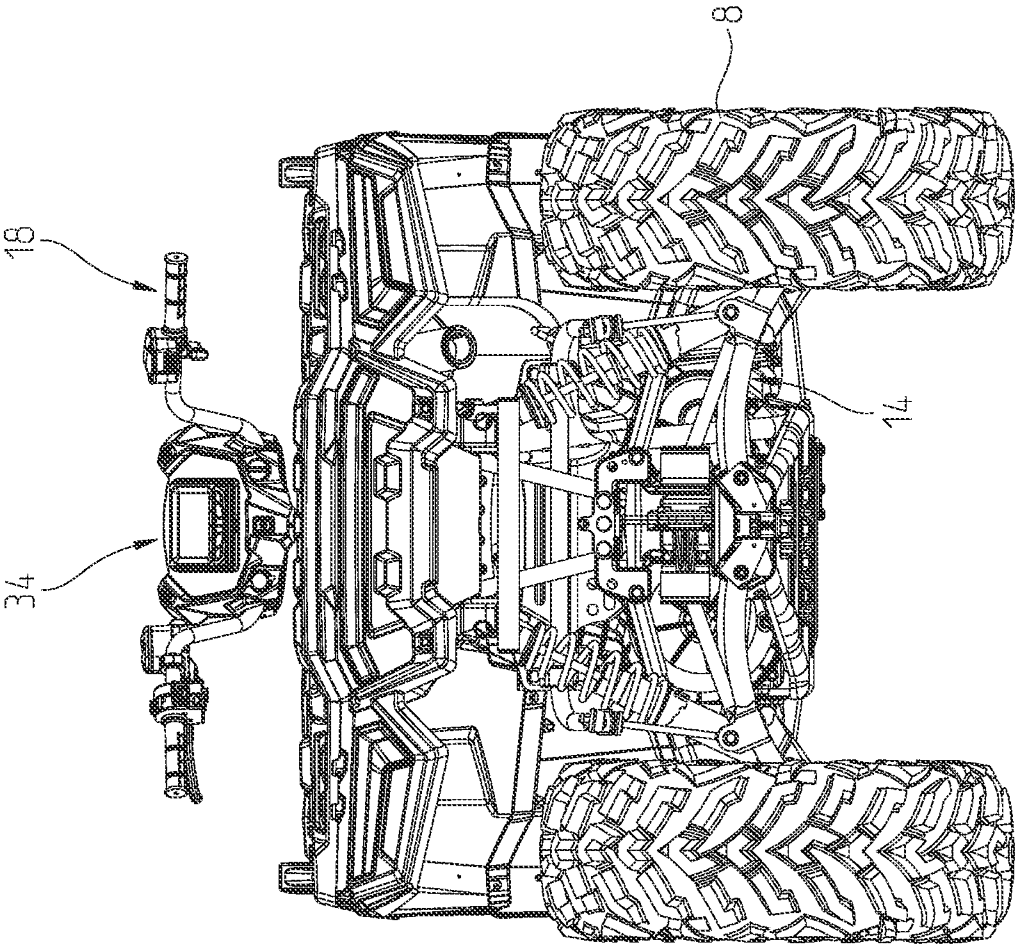
FIG. 7 is a rear view of the all-terrain vehicle of FIG. 1.

With reference first to FIGS. 1-7, a vehicle 2 is shown as an all-terrain-vehicle (ATV) including a frame 4 (FIG. 3) coupled to and supported by front wheels 6 and rear wheels 8. Front wheels 6 comprise tires 6*a* and rims 6*b*. Rear wheels 8 comprise tires 8*a* and rims 8*b*. ATV generally includes a power train shown at 10 (FIG. 3), which will be described in further detail herein. Front wheels 6 are coupled to frame 4 by way of a front suspension 12 (FIG. 6), and rear wheels 8 are coupled to frame 4 by way of a rear suspension 14 (FIG. 7). ATV further includes a seat assembly 16, which as shown in FIGS. 1 and 2 is for a single rider, but ATV 2 could be modified to incorporate two riders as described in U.S. Pat. No. 8,678,464 or 8,430,442, the subject matter of which is incorporated herein by reference. ATV 2 also includes a steering assembly 18 for steering at least the front wheels 6 as is known in the art. Steering assembly 18 could be similar to that described in U.S. Pat. No. 8,122,993, the subject matter of which is incorporated herein by reference.

ATV 2 also includes an outer body 20, generally formed of a plastic material. Outer body 20 may include at least foot pedestals 22 for placement of a rider's feet while riding, where a left foot pedestal is referred to as 22L and a right foot pedestal is referred to as 22R. A front rack 24 is provided forward of steering assembly 18 and a rear rack 26 is provided rearward of seat 16. It should be appreciated that front rack 24 could include a plurality of tie downs and/or could include a moveable portion such as a hood to expose a storage cavity for storing items while riding.

It should also be appreciated that rear rack 26 could include integrated tie down portions such as those described in U.S. Pat. No. 8,905,435, the subject matter of which is incorporated herein by reference. Front and or rear rack could also include apertures 28 for receiving an expansion member similar to that shown and/or described in U.S. Pat. No. 8,267,034, the subject matter of which is incorporated herein by reference. Outer body 20 may also include front facia 30, front fairing 32, light pod 34, left inner-panel 36, right inner-panel 38 (FIG. 4), left side-panel 40, right side-panel 42, and fender body panels 44.

Figure 8:
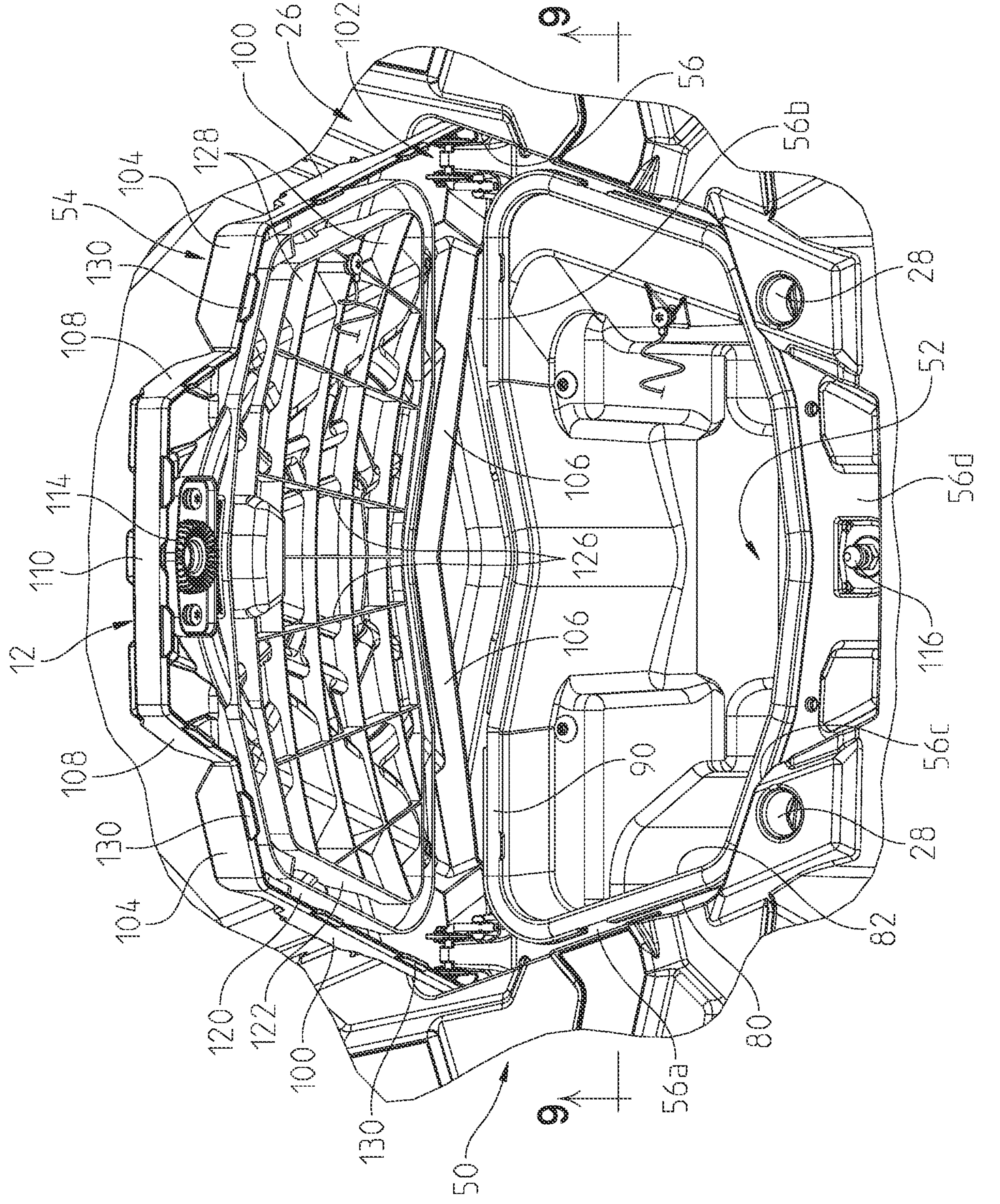
FIG. 8 is a rear perspective view of the rear rack and storage compartment.

With reference now to FIGS. 8-11, rear rack 26 will be described in greater detail. With reference first to FIG. 8, rear rack 26 includes an integrated storage compartment or bin shown generally at 50 which includes an integral storage well 52 and a rotatable cover 54. As shown best in FIG. 9, well 52 is integrated with the rear rack 26, that is, well 52 is formed from a unitary construction such as from a plastic material integrally molded with the rear rack. As shown, storage compartment 50 is provided such that rear rack 26 defines an indentation at 56 which defines sidewalls 58 and a lower wall 60. Lower wall 60 is then integral with sidewalls 62 and 64 which merge into sidewalls 66 and 68 and lower surface 70 of well 52. As shown best in FIGS. 8 and 9A, wall 60 includes two ribs 80 and 82 with define a channel 84 which circumscribes the well 52. An O-ring seal 90 is positioned in the channel 84 and surrounds the well 52 as best shown in FIG. 8.

Figure 9:
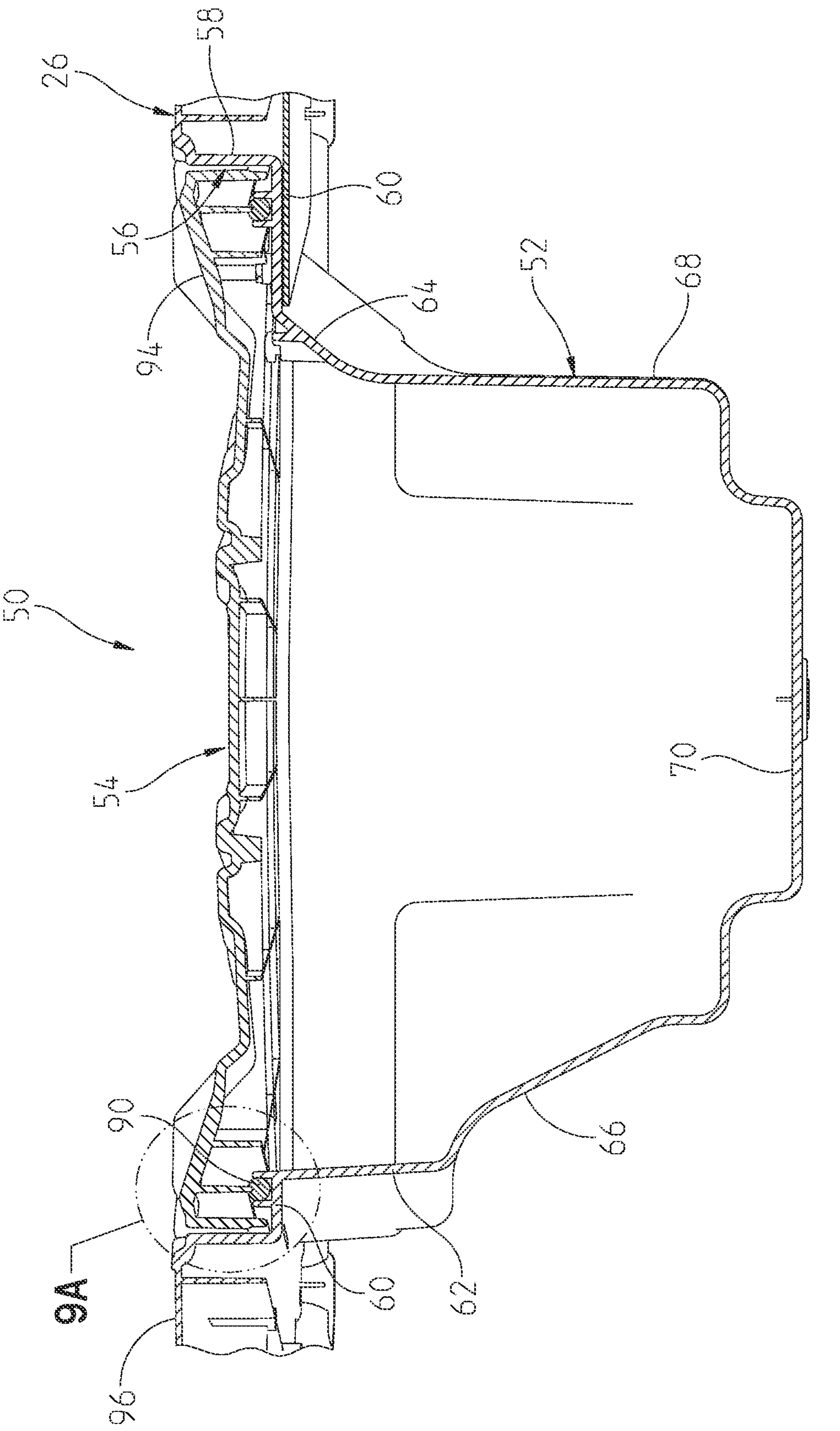
FIG. 9 is a cross-sectional view through lines 9-9 of FIG. 8.
Figure 9A:
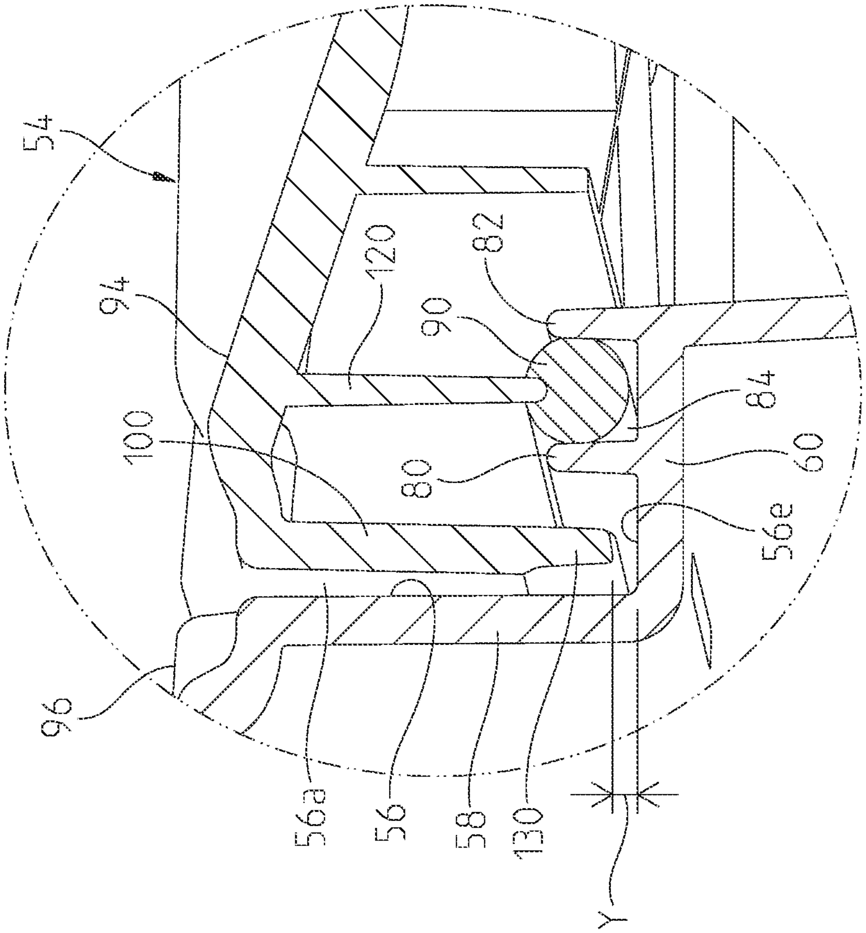
FIG. 9A is an enlarged portion of FIG. 9.

With reference to FIGS. 8-9A, cover 54 will be described in greater detail. As shown best in FIG. 9, top cover 54 includes a top surface 94 which generally conforms with a top surface 96 of the rear rack 26. Cover 54 includes sidewalls 100 which extend into the indentation 56 such that the cover rotates into the indentation when the cover is closed. Cover 54 rotates about rear rack 26 through a hinge assembly 102 as described in greater detail herein. As shown best in FIG. 8, cover 54 conforms to the indentation 56 and includes wall portions 100, 104, rear wall portions 106, and wall portions 108 and 110 which define an extension at 112. Extension 112 includes a latch component at 114 which corresponds to a latch portion 116 located in the indentation 56.

It should be appreciated that each of the wall portions 100, 104, 106, 108 and 110 rotate into the indentation 56 upon closure of the cover 54. More particularly, rib 80 defines indentation portions such that cover wall portions rotate into the indentation, namely sidewalls 100 rotate into indentation portion 56*a*, wall portions 106 rotate into indentation portion 56*b*, wall portions 104 rotate into indentation portion 56*c*, and extension 112 rotates into indentation portion 56*d*.

As shown best in FIG. 8, an underside of cover 54 includes a plurality of rigidifying ribs, namely an outer rib 120 and an inner rib 122. Outer rib 120 extends in a circular fashion around and inside of cover 54 and inner rib 122 is generally parallel with rib 120 adjacent a perimeter of the cover 54. Cover 54 also includes a plurality of longitudinally extending ribs 126 and a plurality of cross ribs 128 to rigidify cover 54. As shown best in FIG. 9A, outer rib 120 is profiled to be centered on channel 84 and therefore when cover 54 is in a closed position, rib 120 extends downwardly into O-ring 90 forming a sealed connection for the well portion 52. In addition, cover 54 has an overstress protection to prevent damaging hinge 102. That is, walls 100, 104, 108 and 110 include tabs 130 which define standoffs to define a maximum amount of deflection of cover 54 relative to rear rack 26. That is, as cover 54 forms a weight-bearing portion of the rear rack 26, cover 54 is defined with a minimum amount of deflection defined by a distance "Y" as shown in FIG. 9A. That is, cover 54 would deflect downwardly due to weight placed upon the top of the cover 54, under the resilient deflection between rib 120 and O-ring 92, until tab 130 contacts surface 56*e* of indentation of 56.

Figure 10:
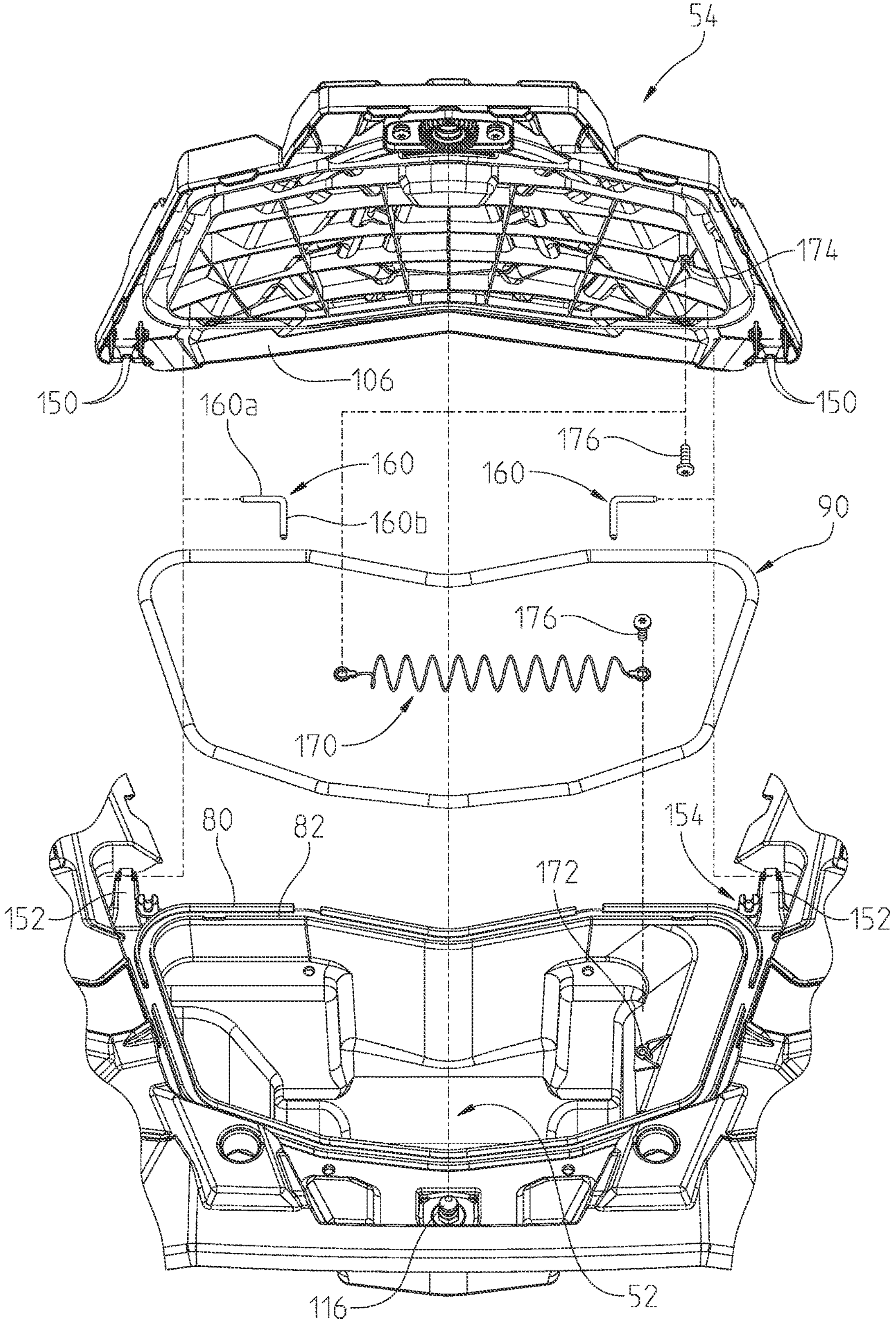
FIG. 10 is a view similar to that of FIG. 8 shown in an exploded manner.
Figure 11:
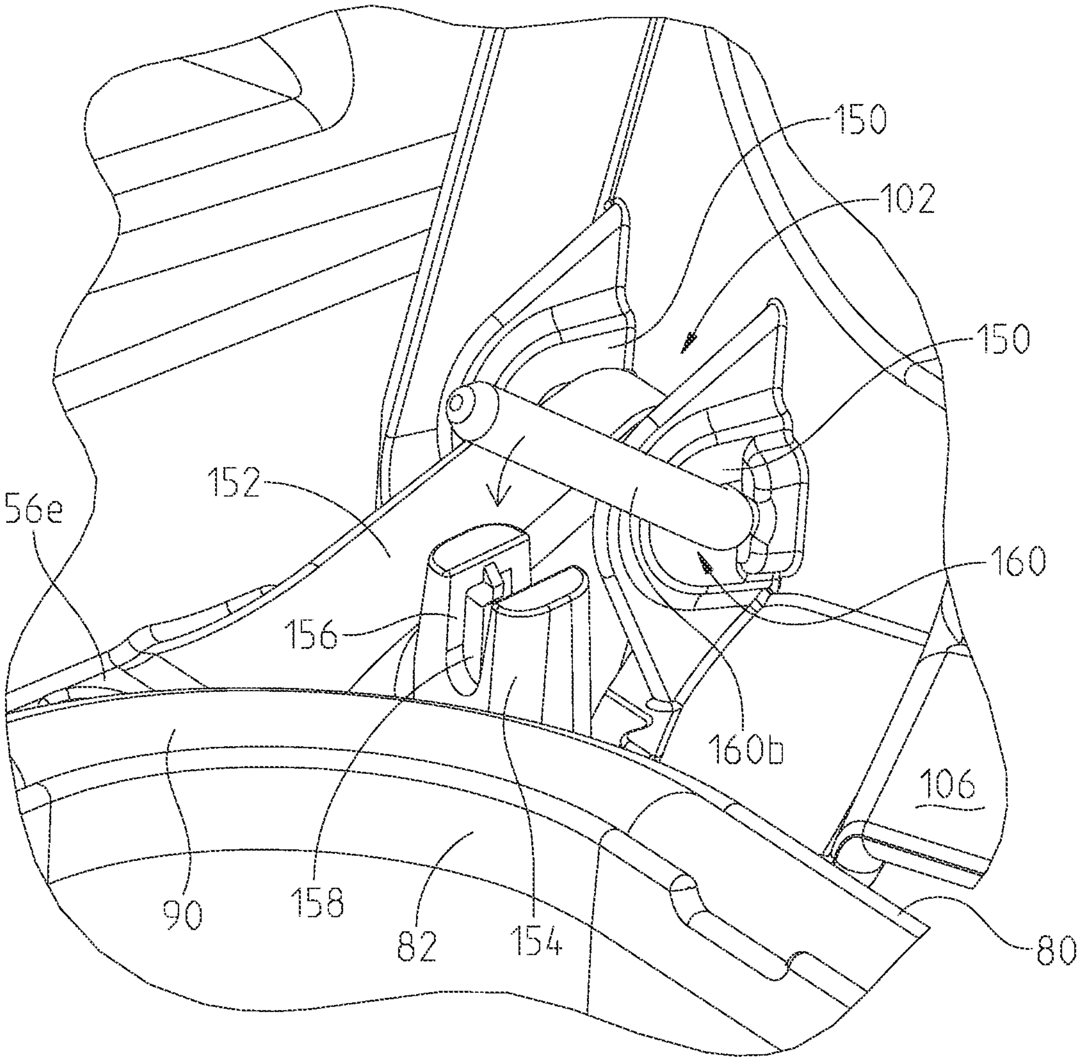
FIG. 11 shows an enlarged view of the hinge shown in FIG. 10.
Figure 12:
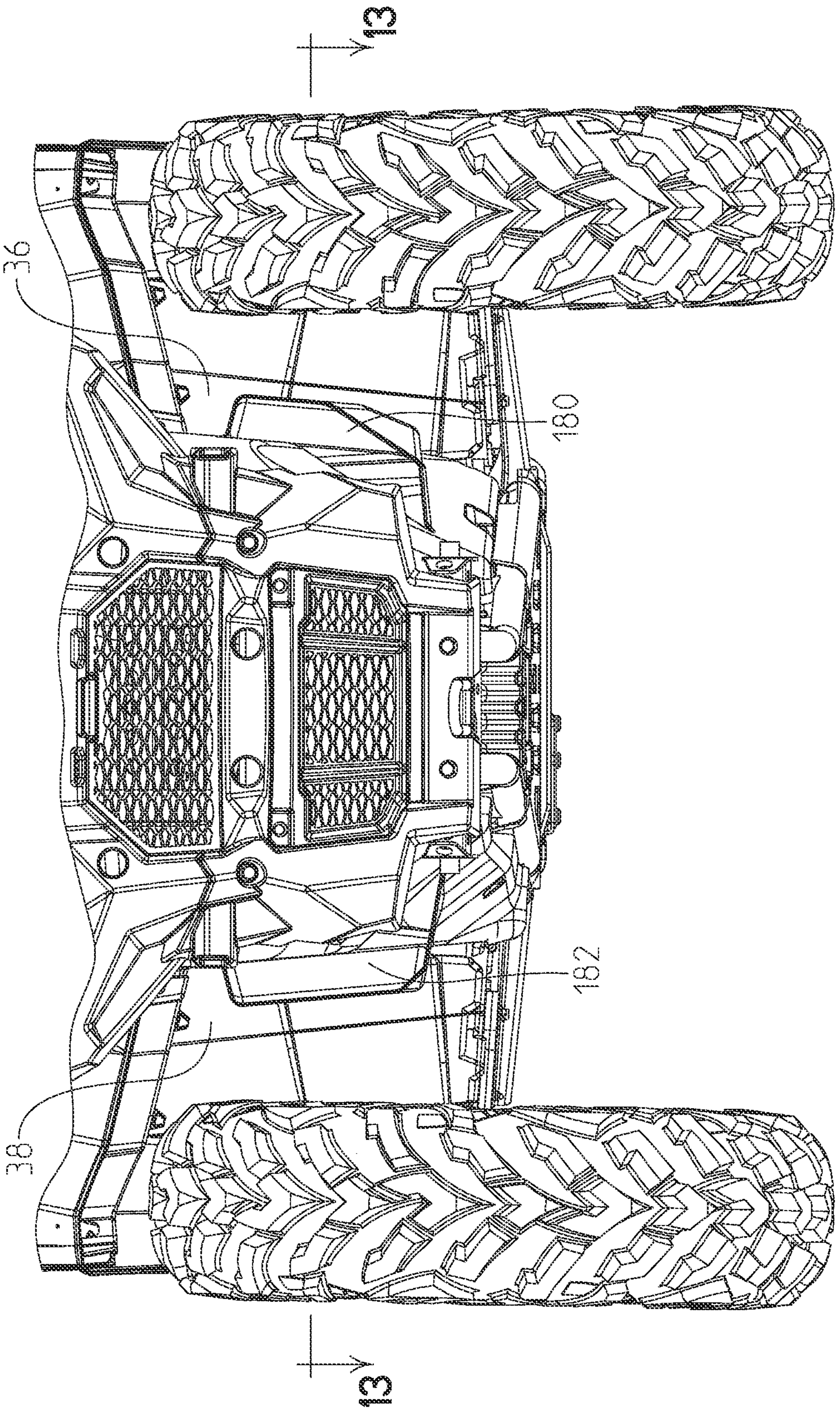
FIG. 12 shows an enlarged view of the front of the vehicle with the suspension and front drive mechanism removed for clarity.

With reference now to FIGS. 10 and 11, hinge 102 will be described in greater detail. As shown, wall 106 of cover 54 includes flanges 150 and post 152 extends upwardly and rearwardly from surface 56*e* as best shown in FIG. 11. Latch assembly 102 further includes an interference post 154 having a slot 156 having interfering walls 158. Latch assembly 102 further includes an L-shaped pin 160 having a first portion 160*a* receivable through flanges 150 and post 152 and a second portion 160*b* which may be moved in the direction of the arrow in FIG. 11 to be received in interference fit with walls 158.

Finally, a lanyard 170 is provided to define an extreme open position where lanyard 170 may be coupled to a first position 172 within well 52 and a second position 174 on a backside of cover 54. Lanyard may be attached by way of fasteners such as 176.

From the above disclosure it should be apparent that the storage bin is integrally formed with the rear rack. Also, the cover conforms to the top surface of the rear rack and forms a load bearing surface, that is surface 94 conforms to surface 96, as best shown in FIGS. 9 and 9A. Also, the rear rack 26 includes a channel 84 surrounding the storage bin and a seal is positioned within the channel and surrounds the storage bin. The cover 54 is rotatably positioned over the storage bin and contacting the seal 90 when in a closed position.

As disclosed herein, the rear rack 26 is formed with an indentation 56 and the cover 54 fits within the indentation. The cover 54 is movable downwardly to a position where a portion of the cover contacts a floor 60 of the indentation. The portion contacting the floor comprises standoff tabs 130.

Figure 4:
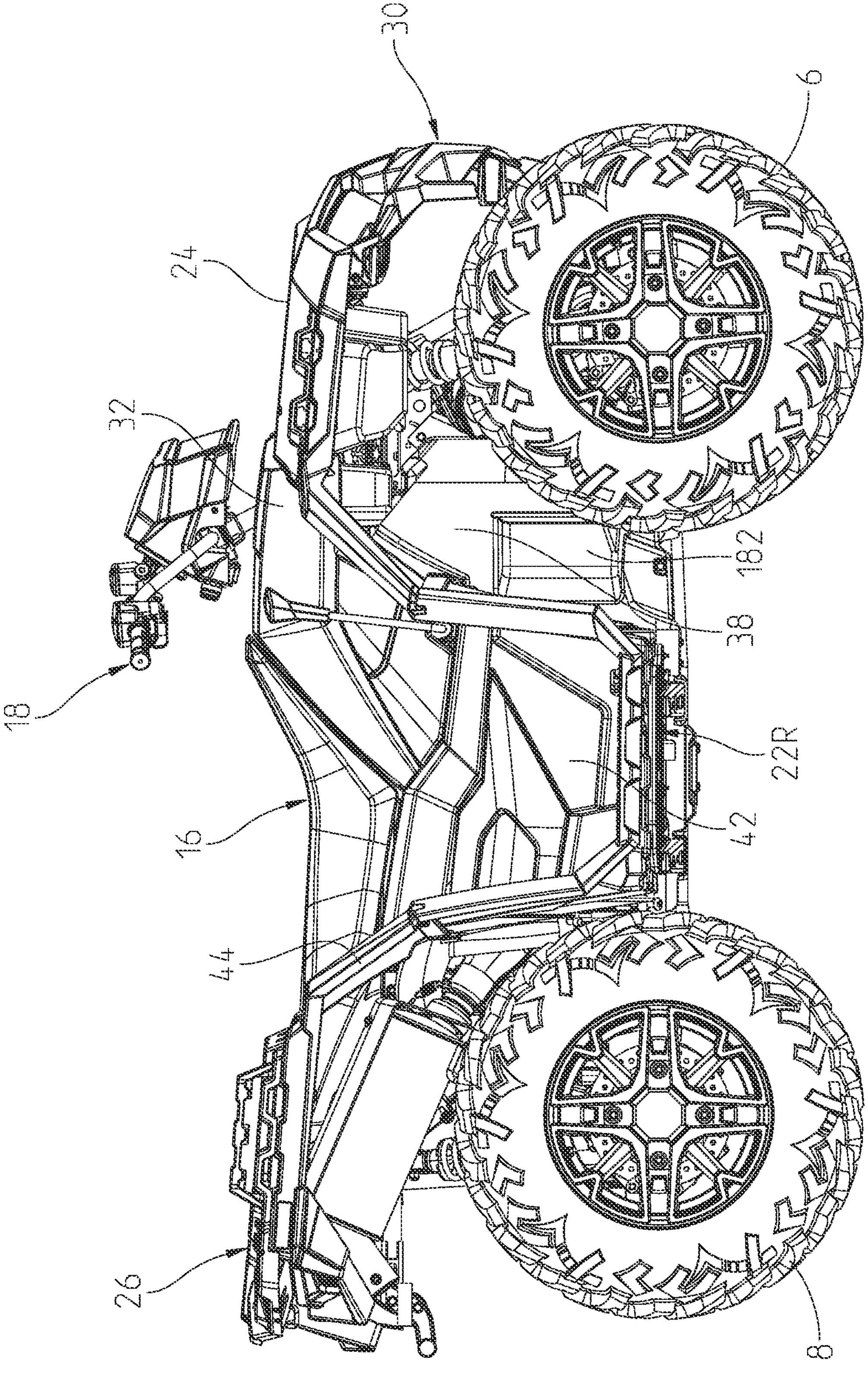
FIG. 4 is a right side view of the all-terrain vehicle of FIG. 1.
Figure 5:
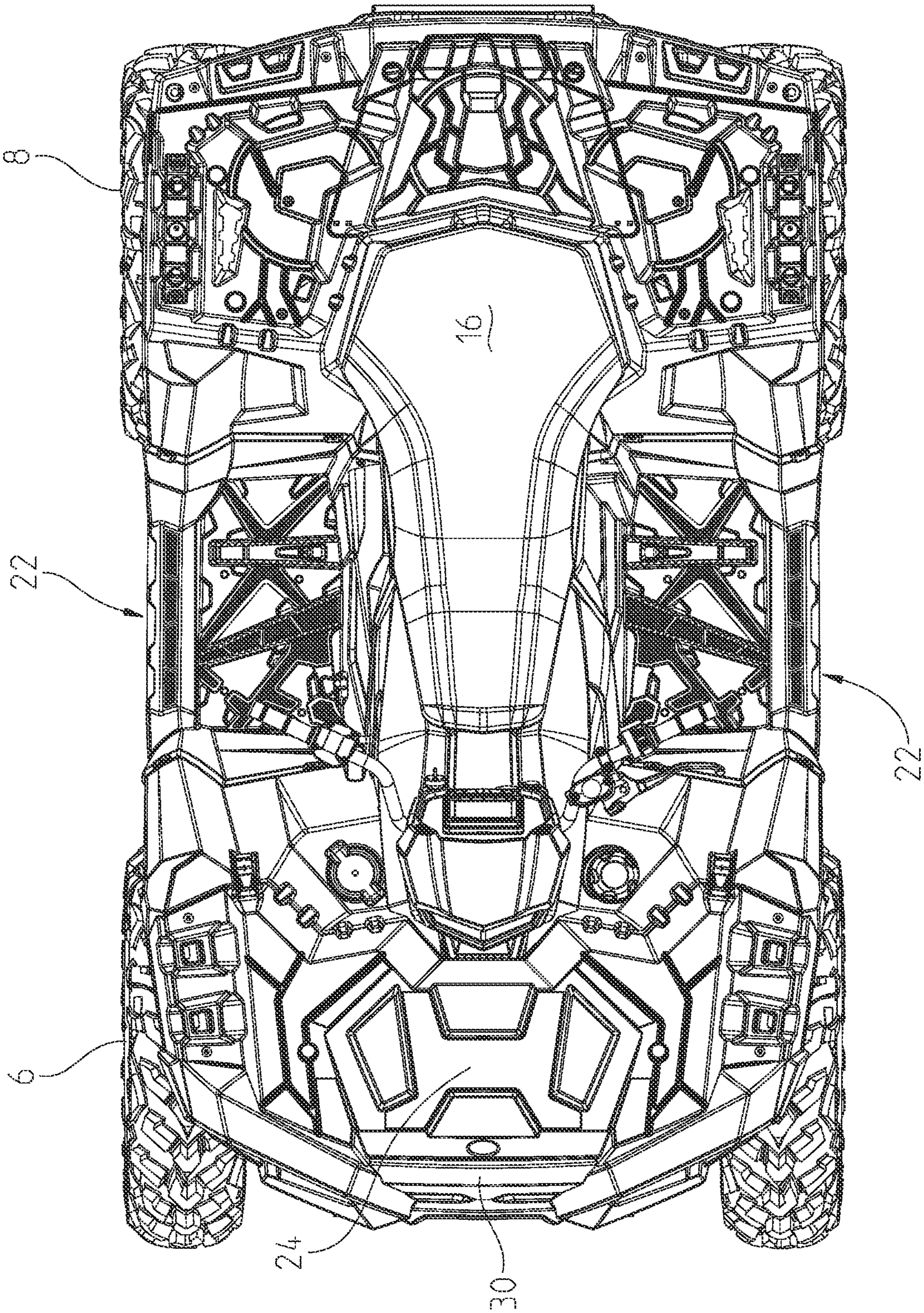
FIG. 5 is a top view of the all-terrain vehicle of FIG. 1.
Figure 6:
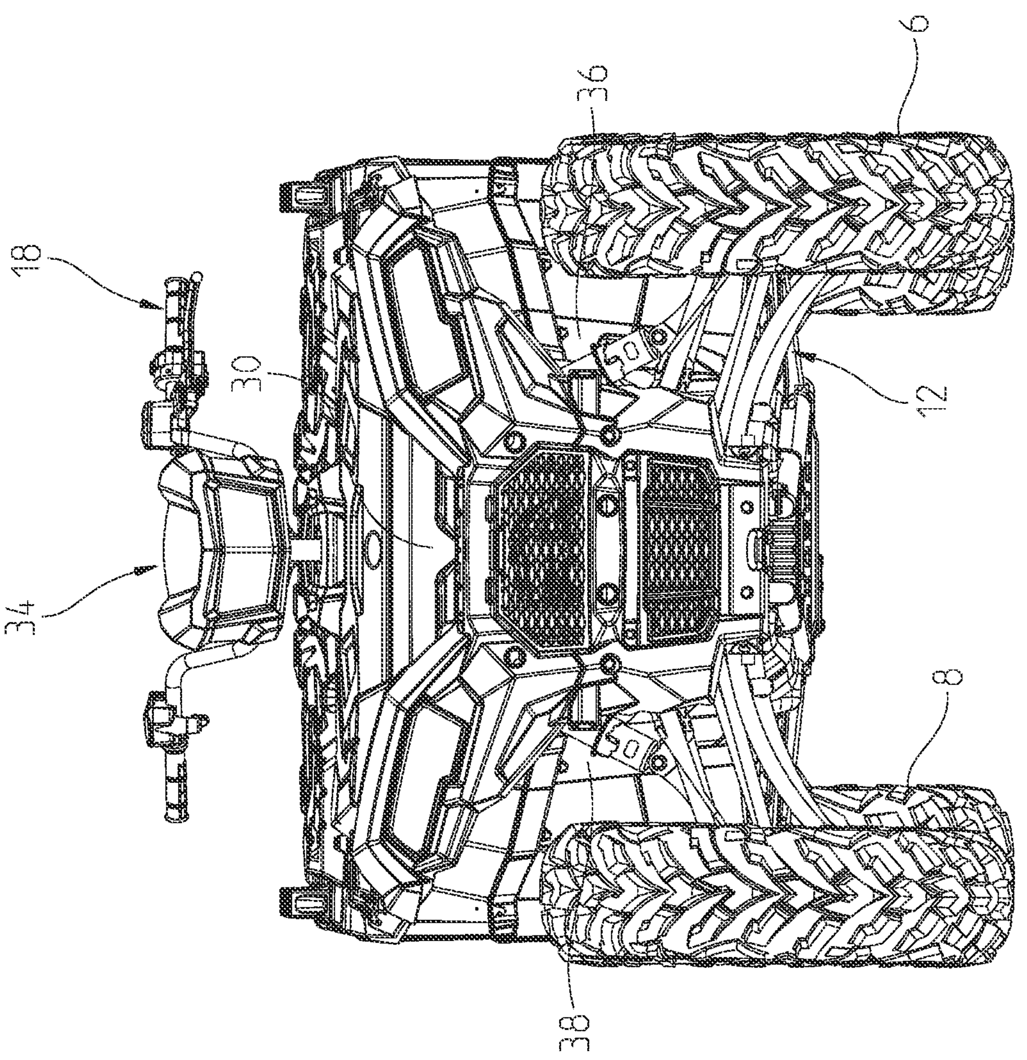
FIG. 6 is a front view of the all-terrain vehicle of FIG. 1.
Figure 15:
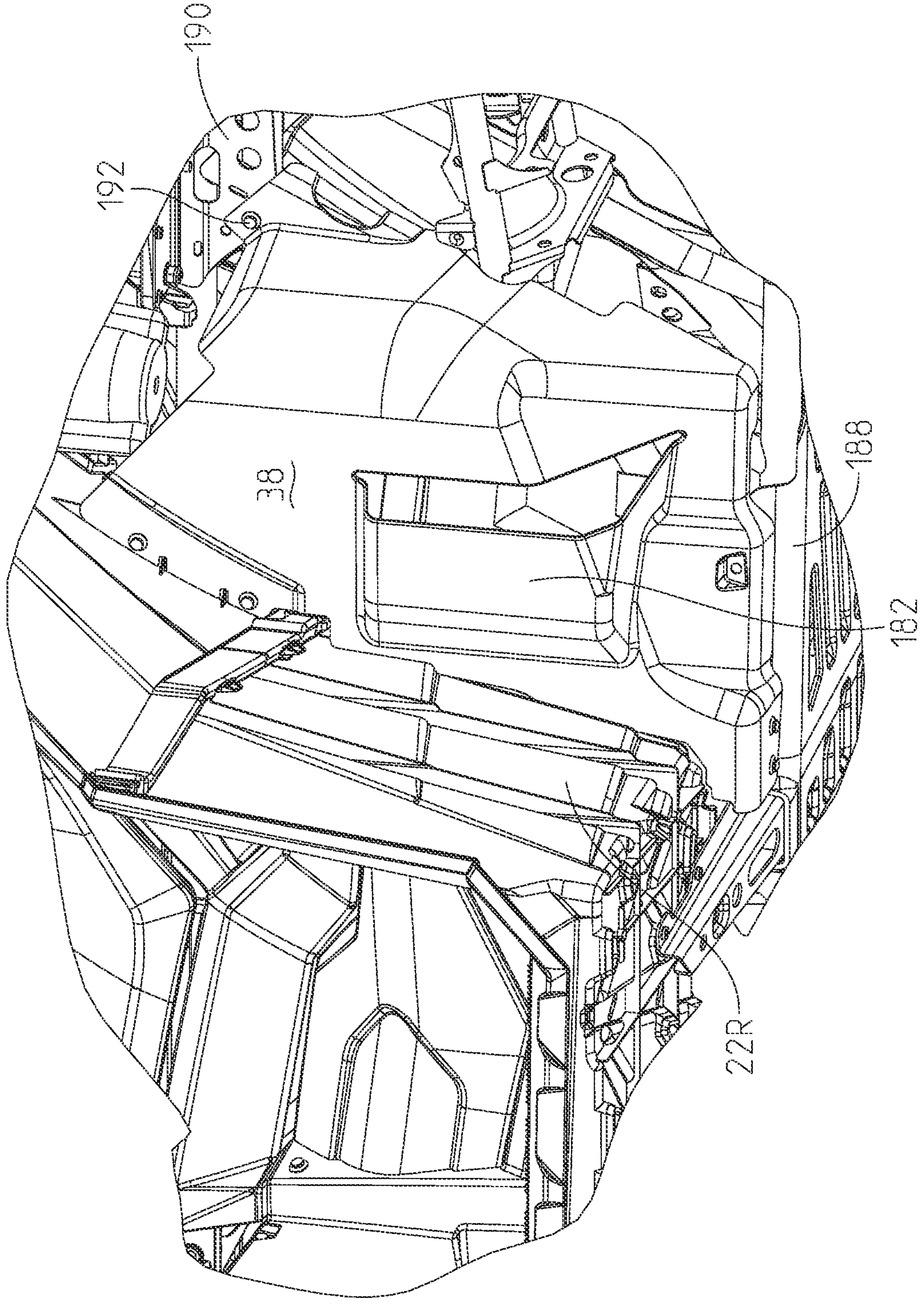
FIG. 15 is a right perspective view of the air ventilation system.
Figure 16:
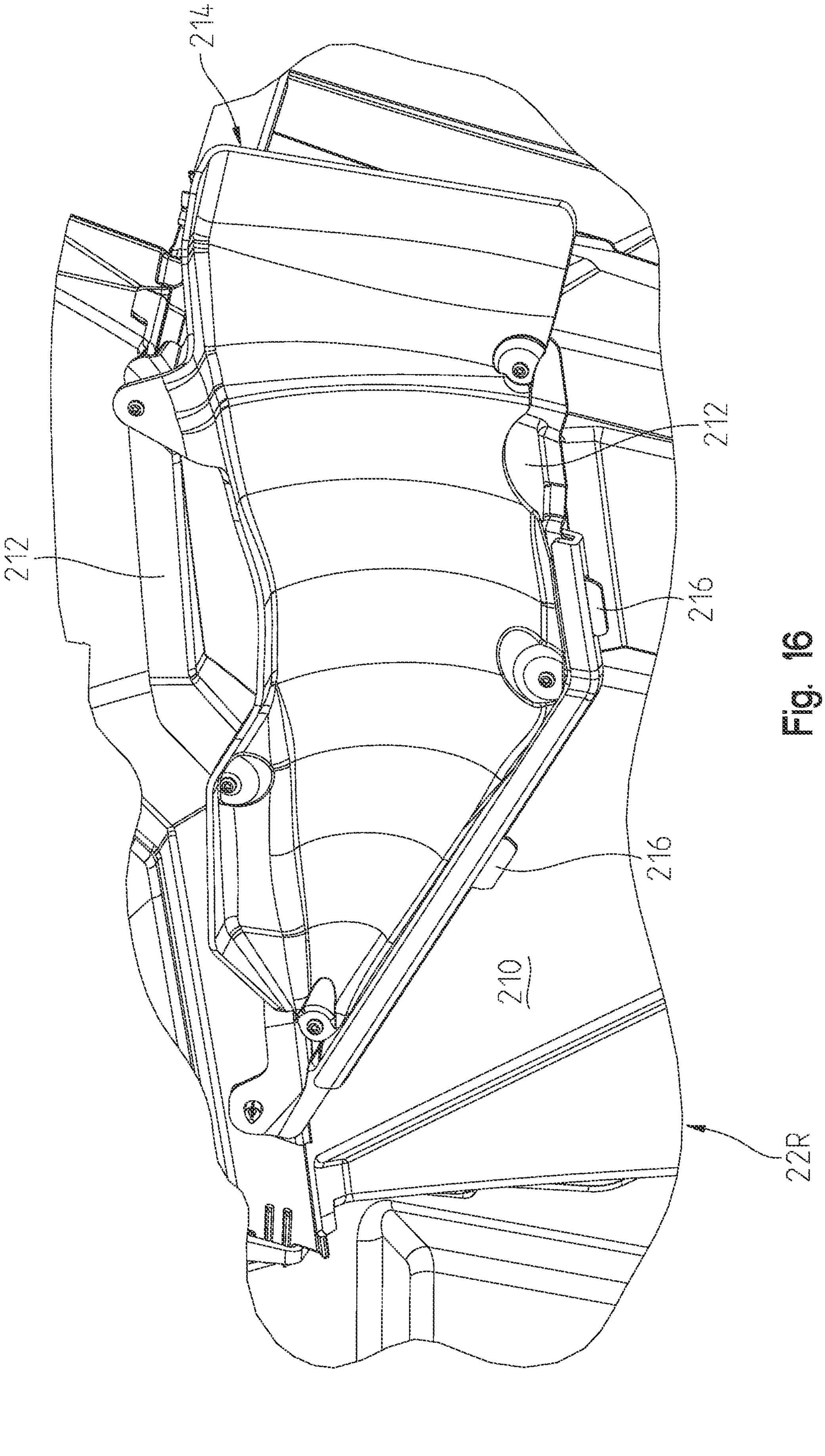
FIG. 16 shows a rear perspective view of a portion of the right side panel.

With reference now to FIGS. 12-18, an air cooling/ventilation system of the vehicle will be described. With reference first to FIGS. 1 and 4, front panel 36 is shown positioned directly in front of and adjacent a rear wall of left foot-pedestal 22L whereas front panel 38 is shown positioned directly in front of and adjacent a rear wall of right foot-pedestal 22R. As shown, front panel 36 defines an air scoop 180 and front panel 38 defines an air scope 182. As shown best in FIG. 14, left panel 36 is shown with air scoop 180 facing forwardly where panel 36 is positioned in front of a front wall 186 of left foot-pedestal 22L. Panel 36 is coupled to a lower frame portion 188 and an upper frame portion 190 by way of fasteners 192 as is known in the art. With reference to FIG. 15, panel 38 is shown with air scoop 182 facing forwardly and positioned directly in front of right foot-pedestal 22R. Panel 38 is coupled to the frame portions 188 and 190 by way of fasteners 192.

Figure 3:
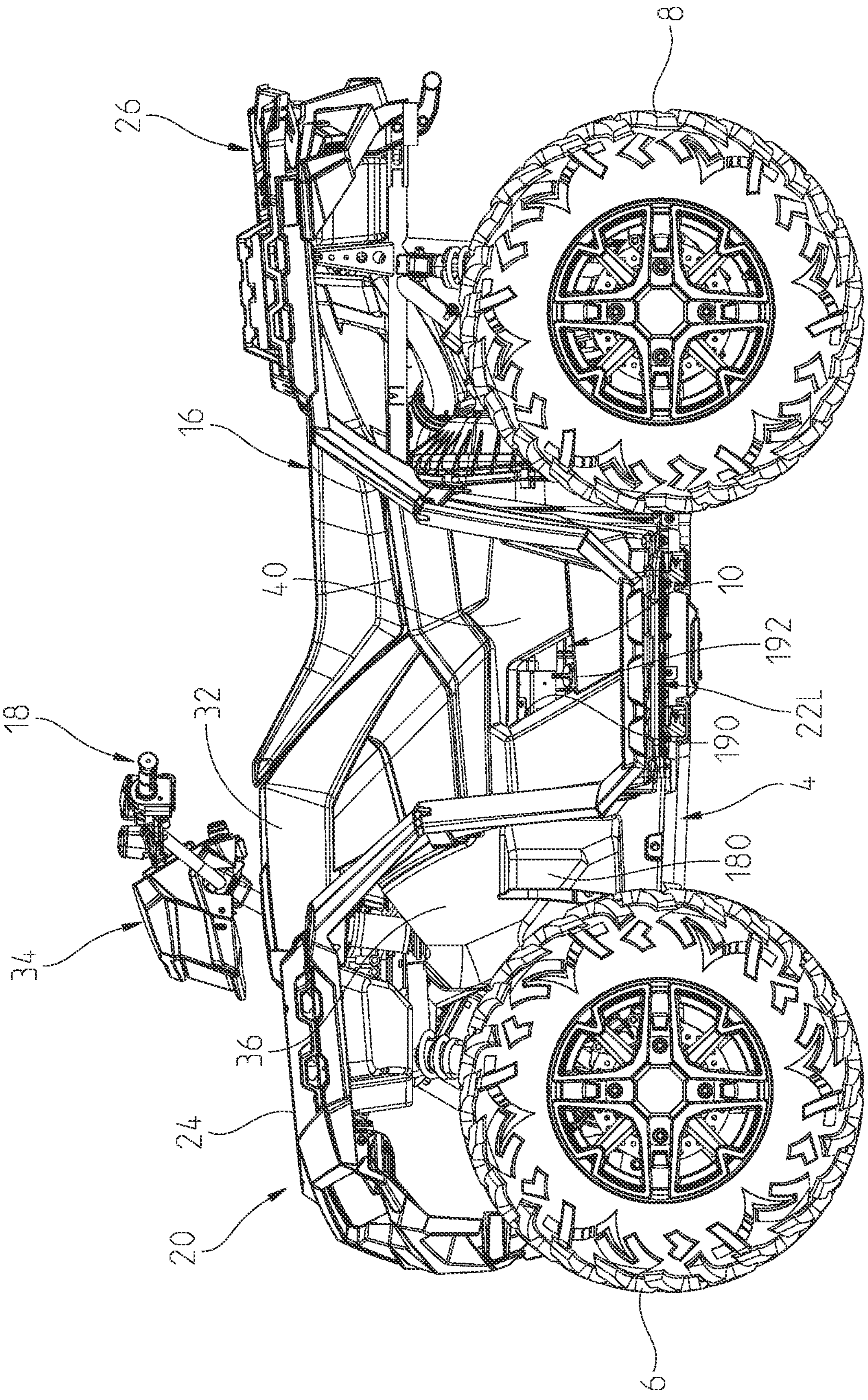
FIG. 3 is a left side view of the all-terrain vehicle of FIG. 1.

As shown in FIGS. 3 and 4, side panels 40 and 42 of foot-pedestals 22L and 22R, respectively are substantially closed off from the engine compartment with the exception of a small trapezoidally-shaped opening 190 in the left panel 40 to provide access to the engine oil dipstick 192 as shown in FIG. 3. As shown in FIG. 4, panel 42 is substantially closed off from the engine. The closing off of the side panels 40 and 42 provides a cleaner atmosphere for the rider such that mud and debris does not kick up from the front tires and land on the foot-pedestals or on to the rider. However the closing off the side panels prevents heat from the engine from dissipating outwardly and thus the air scoops provide a cooling effect for the engine and remaining power training components. As shown best in FIG. 13, the cross-sectional view shows the air flow pattern in greater detail.

Figure 13:
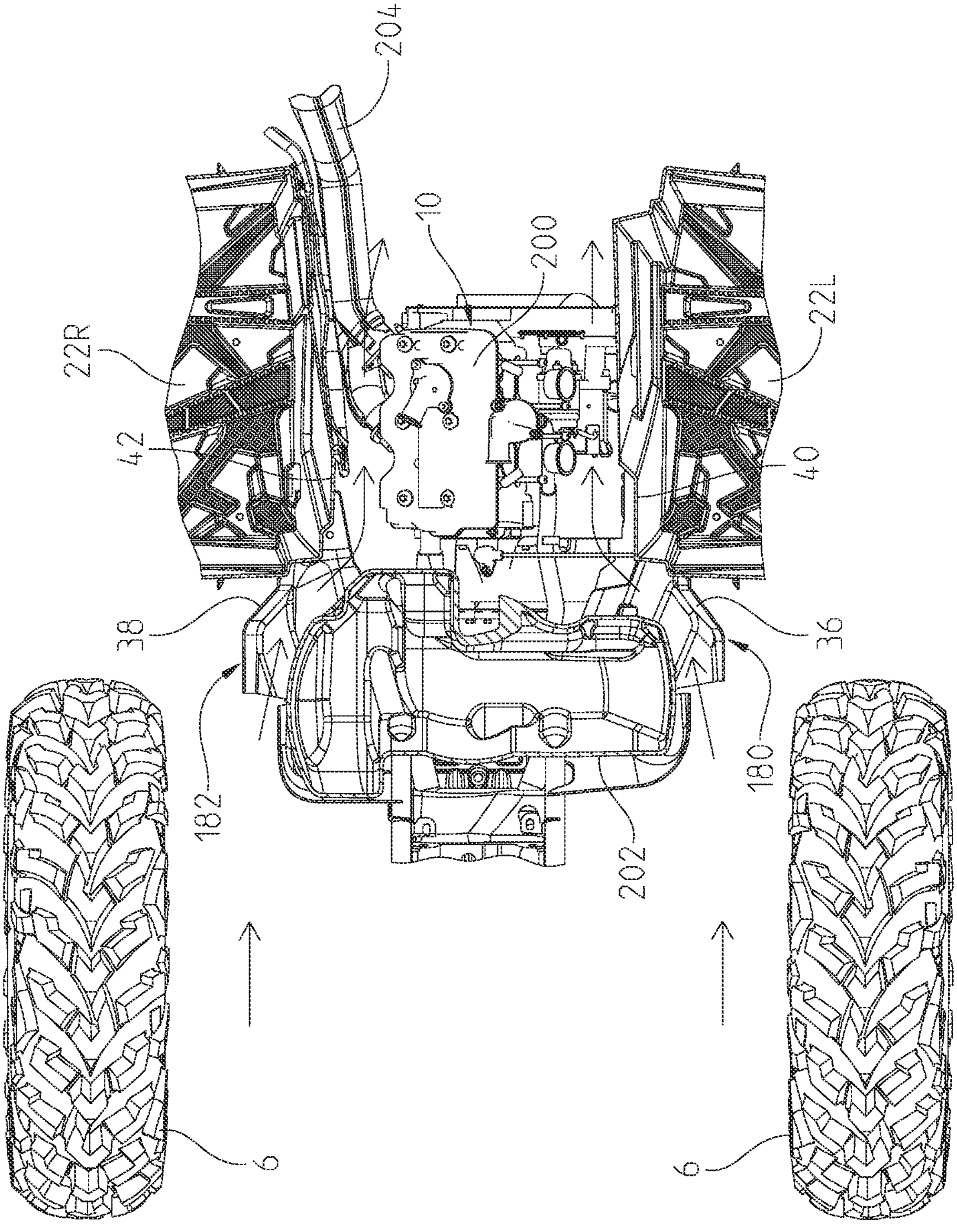
FIG. 13 is a cross-sectional view through lines 13-13 of FIG. 12.
Figure 14:
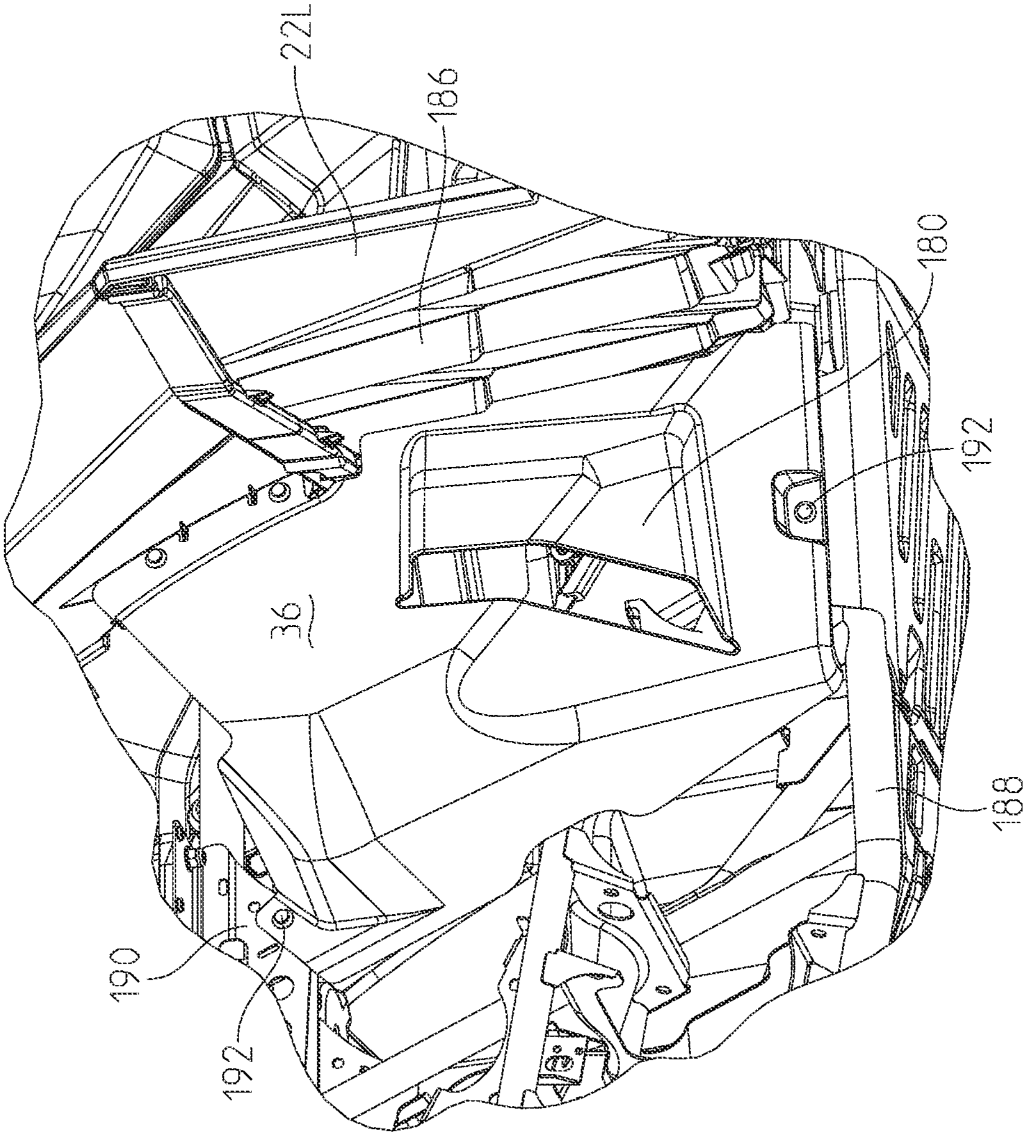
FIG. 14 is a left perspective view of the air ventilation system.

As shown, powertrain 10 includes an engine 200 and a vehicle component 202 positioned forwardly of the engine 200. In the embodiment shown, the vehicle component 202 is a fuel tank. The location of the fuel tank 202 creates an air dam at the front of the vehicle causing the airflow to be redirected to either a right side or left side of the fuel tank 202. It should be understood that the vehicle component could be other than a fuel tank, for example, the vehicle component could be a storage compartment, and the fuel tank could be placed elsewhere. Air scoops 180 and 182 pickup that airflow and redirect it through air channels into an inside of the engine compartment and on a backside of the side panels 40 and 42 and on either side of the engine 200 as shown in FIG. 13. Engine 200 is coupled to an exhaust system 204 such that the airflow through air scoops 180 and 182 moves rearwardly through the vehicle and also cools the exhaust 204.

Figure 17:
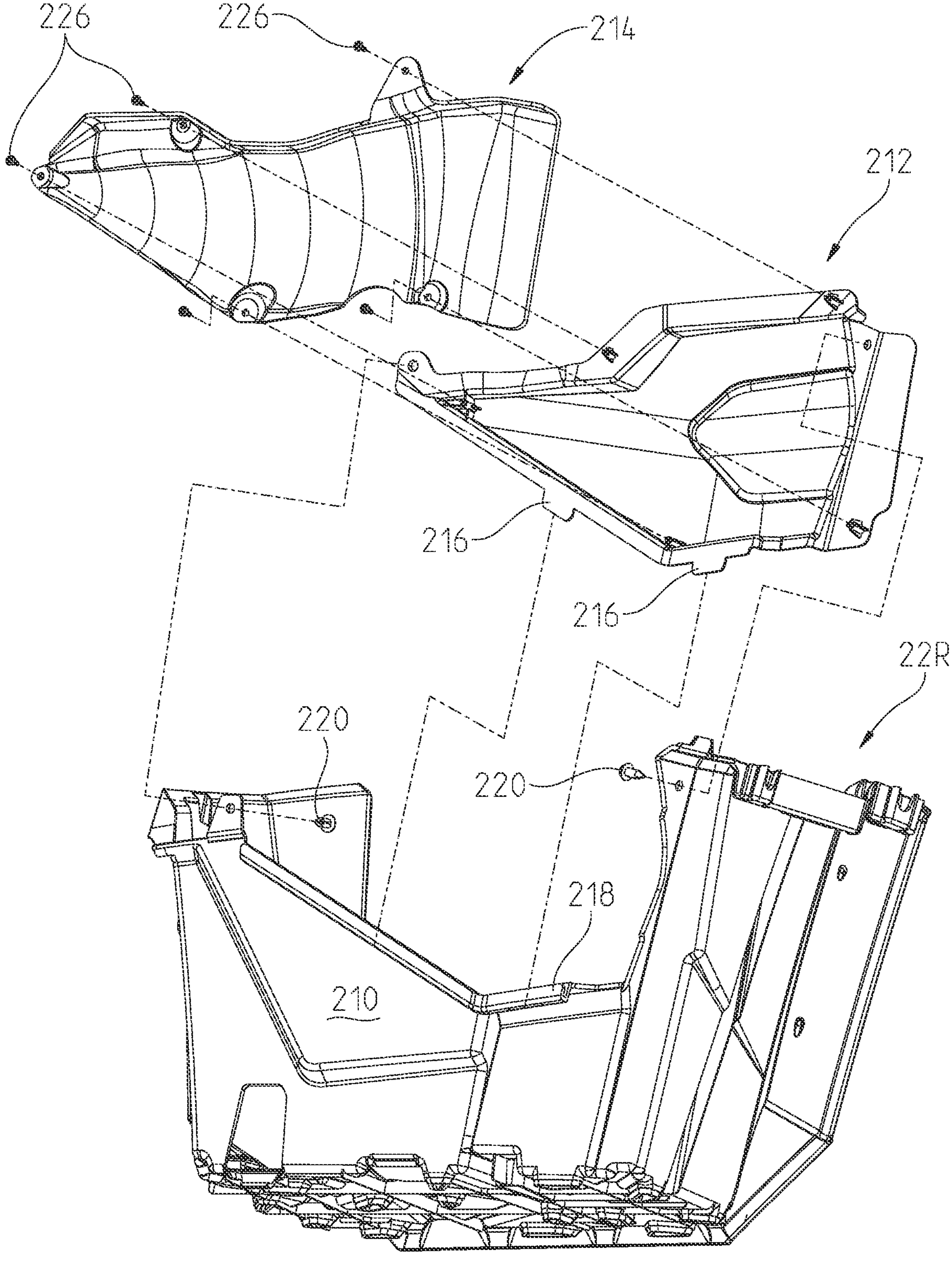
FIG. 17 is an underside right front perspective view showing the right foot pedestal and side panel in an exploded manner.
Figure 18:
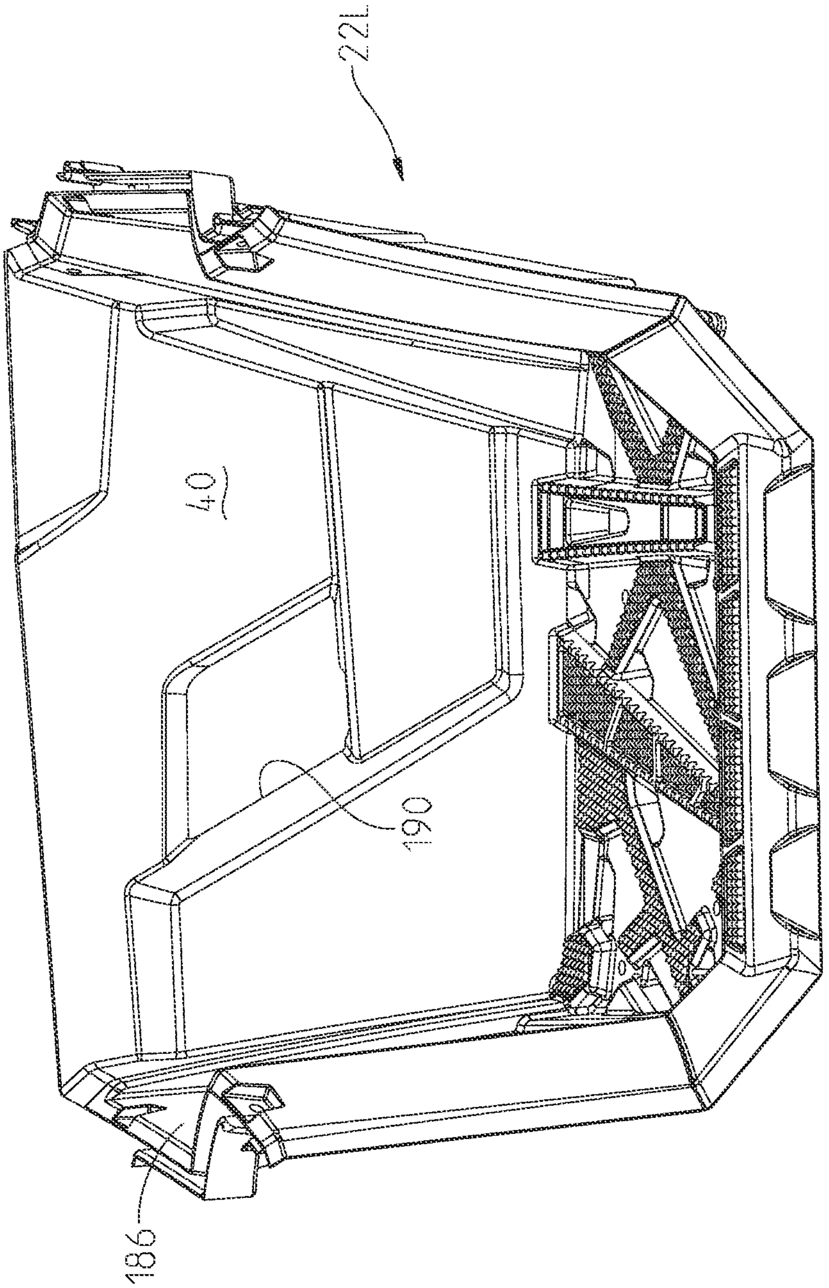
FIG. 18 shows a perspective view of the left foot pedestal.

With reference to FIGS. 17 and 18, the foot-pedestals 22R and 22L will be described in greater detail. With reference first to FIG. 17, the panel portion 42 of right pedestal 22R is defined by the rear wall 210 of the foot-pedestal 22R together with panel portions 212 and 214. Panel portion 212 includes lower tabs 216 which couple with a channel 218 in right foot pedestal 22R and by way of fasteners 220. Meanwhile panel portion 214 is coupled to panel portion 212 by way of fasteners 226. The two panel portions 212 and 214 coupled to side wall 210 of foot-pedestal 22R encloses a side of the foot well as shown best in FIG. 16. Foot pedestal 22L is shown in FIG. 18 where aperture 190 is integrally formed in the panel portion 40 of foot-pedestal 22L.

Thus, from the above disclosure, it should be apparent that the air ventilation system includes at least one air scoop adjacent a front of the vehicle for directing the air rearward to cool the engine compartment. While two air scoops are shown, it is conceivable that the all-terrain vehicle has at least one air scoop. As shown in FIG. 13, the air scoops 180, 182 are longitudinally positioned adjacent a rearwardmost position of the front wheels 6. In addition, the right and left air scoops 180, 182 are positioned laterally inward of an inwardmost position of the front ground engaging members. Furthermore, the frame includes upper and lower frame rails and the right and left air scoops 180, 182 are positioned vertically intermediate the upper and lower frame rails. Finally, the right and left air scoops 180, 182 are positioned laterally outward of the body panels 40, 42.

As disclosed, the all-terrain vehicle 2 further includes a vehicle component forward of the engine forming an air dam, where the right and left air scoops 180, 182 are positioned laterally outward of the outward most position of the vehicle component. As disclosed, the vehicle component is a fuel tank 202. Furthermore, the side panels 40, 42 (with air scoops 180, 182) are cooler than when the side panels were left open (with no air scoops). It has been shown that the temperature drop is roughly 15-20% or about 20° F. cooler.

Figure 19:
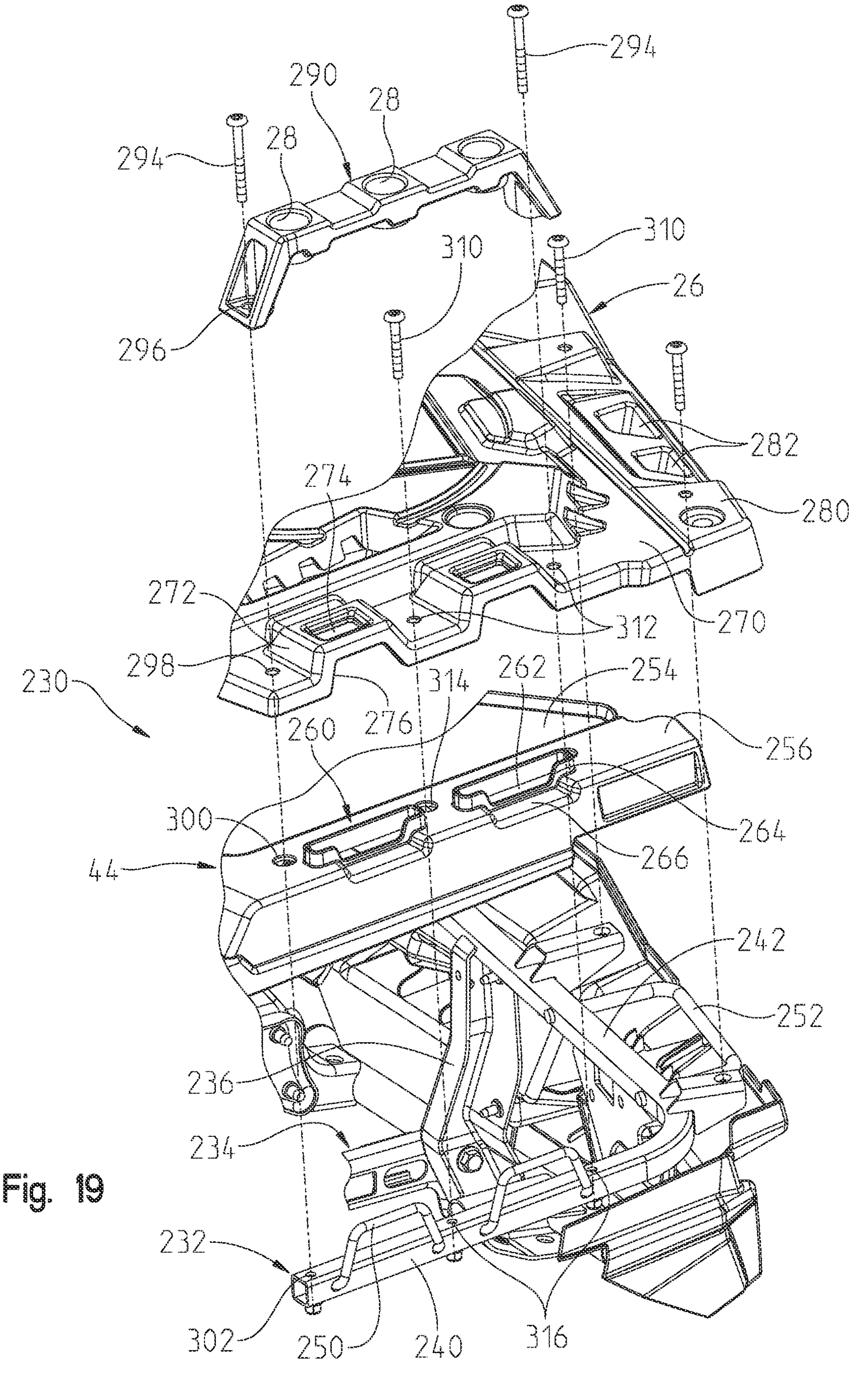
FIG. 19 shows an exploded view of the tie-downs positioned in the rear rack.

With reference now to FIG. 19, integrated tie-downs will be described, and will be referred to generally as 230. As shown in FIG. 19, a rack frame is shown at 232, coupled to the upper frame rails 234 by way of upstanding gussets 236. Rack frame 232 includes generally longitudinally extending portions 240 (only one of which can be viewed in FIG. 19), and a horizontally extending portion 242. Tie-down bars 250 and 252 are coupled directly to the rack frame 232 such as by welding.

As shown, fender body panel 44 includes a rear panel 254 having a side wall 256 along a marginal edge of the fender body panel 44. Wall 254 includes upstanding perimetral wall 260 encircling an opening 262. Wall 260 includes a relief portion 264 and wall 256 includes a relief section 266. It should be appreciated that wall 256 sits flush against rear rack frame 232, such that tie-down bars protrude upwardly thought the openings 262. As also shown, rear rack 26 includes a side marginal edge 270 having upstanding pockets 272. Pockets 272 define openings 274 and relief areas 276.

When the rack 26 is positioned over the fender body panel 44, the tie-down bars fit within the pockets 272, adjacent the relief areas 276, so as to not obstruct the openings 274. Thus, a tie-down strap can be positioned through the opening 274, or through the relief area 276 such that a hook on the tie-down strap catches the tie-down bars 250. In this manner, tension is placed on the frame of the vehicle, not on the plastic body panels such as the fender panel 44 or rack 26.

In a similar manner, the rear rack 26 includes a rear marginal edge 280 having apertures 282 which overlie the tie-down bars 252 for receiving tie-down straps through apertures 282.

With reference still to FIG. 19, rack extenders are shown at 290 which couple over the top of the pockets 272, which act to provide additional tie-down points and to provide additional apertures 28, for the purpose discussed previously. Rack extender 290 is coupled to the rear rack 26 by way of fasteners 294 through apertures 296 of rack extenders 290; through apertures 298 of rear rack 26; through apertures 300 of fender body panel 44; and into threaded apertures 302 of rear frame 232. Additional fasteners 310 extend through apertures 312 of fender body panel 44; through apertures 314 and into threaded apertures 316.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. An all-terrain vehicle comprising:

a plurality of ground-engaging members;

a frame assembly supported by the plurality of ground-engaging members, the frame assembly including a rear rack frame, wherein at least one tie-down bar is coupled to the rear rack frame;

a plurality of body panels supported by the frame assembly, the plurality of body panels including a fender body panel, the fender body panel including an upstanding wall having a thickness and defining at least one fender opening through the thickness, wherein the at least one tie-down bar protrudes upwardly through the at least one fender opening; and a rear rack supported by the rear rack frame, wherein the at least one tie-down bar of the rear rack frame is aligned with the at least one fender opening of the fender body panel.

2. The all-terrain vehicle of claim 1, further comprising a straddle seat coupled to the frame assembly, wherein the rear rack is positioned longitudinally rearward of the straddle seat.

3. The all-terrain vehicle of claim 1, wherein the rear rack is defined by at least one upstanding wall having a thickness and defining at least one rear rack opening through the thickness.

4. The all-terrain vehicle of claim 3, wherein the at least one rear rack opening is aligned with at least one fender opening, and the at least one tie-down bar is accessible through the at least one rear rack opening.

5. The all-terrain vehicle of claim 4, wherein the upstanding wall of the rear rack defines an upstanding pocket, wherein a portion of the at least one tie-down bar extends through the upstanding pocket.

6. The all-terrain vehicle of claim 4, wherein the at least one rear rack opening is configured to receive a tie-down strap therethrough such that tension from the tie-down strap is placed on the frame assembly.

7. The all-terrain vehicle of claim 1, wherein a portion of fender body panel supports the rear rack.

8. The all-terrain vehicle of claim 1, further comprising a rack extender coupled to the rear rack.

9. A vehicle comprising:

a plurality of ground-engaging members;

a frame assembly supported by the plurality of ground-engaging members, the frame assembly including a rear rack frame, wherein at least one tie-down bar is coupled to the rear rack frame;

a fender body panel supported by the frame assembly and including an upstanding wall having a thickness and defining at least one fender opening through the thickness; and a rear rack supported by the rear rack frame, wherein the rear rack is defined by at least one upstanding wall having a thickness and defining at least one rear rack opening through the thickness, wherein the at least one fender opening and the at least one rear rack opening are aligned with each other, and wherein when cargo is releasably coupled to the tie-down bar, tension is placed on the frame assembly.

10. The all-terrain vehicle of claim 9, further comprising a straddle seat coupled to the frame assembly, wherein the rear rack is positioned longitudinally rearward of the straddle seat.

11. The all-terrain vehicle of claim 9, wherein the upstanding wall of the fender body panel includes a relief area adjacent the at least one fender opening.

12. The all-terrain vehicle of claim 9, wherein the at least one tie-down bar protrudes upwardly through the at least one fender opening.

13. The all-terrain vehicle of claim 12, wherein the at least one tie-down bar is accessible through the at least one rear rack opening.

14. The all-terrain vehicle of claim 13, wherein the at least one rear rack opening is configured to receive a tie-down strap therein and the tie-down strap is configured, to couple to the at least one tie-down bar.

15. The all-terrain vehicle of claim 9, wherein the at least one upstanding wall of the rear rack defines an upstanding pocket, wherein the at least one rear rack opening is defined through the upstanding pocket.

16. The all-terrain vehicle of claim 15, wherein at least a portion of the at least one tie-down bar is received within the upstanding pocket.

17. An all-terrain vehicle comprising:

a plurality of ground-engaging members;

a frame assembly supported by the plurality of ground-engaging members, the frame assembly including a rear rack frame, wherein at least one tie-down bar is integrated with the rear rack frame;

at least one body panel supported by the frame assembly, the at least one body panel including a body panel upstanding wall having a body panel upstanding wall thickness and defining at least one panel opening through the body panel upstanding wall thickness; and a rear rack supported by the rear rack frame, wherein the rear rack is defined by at least one rear rack upstanding wall having a rear rack upstanding wall thickness and defining at least one rear rack opening through the rear rack upstanding wall thickness, wherein at least one tie-down bar protrudes through the at least one panel opening such that the at least one tie-down bar is accessible through the at least one rear rack opening.

18. The all-terrain vehicle of claim 17, further comprising a plurality of tie-down bars positioned about a perimeter of the rear rack frame.

19. The all-terrain vehicle of claim 17, wherein the at least one tie-down bar protrudes upwardly through the at least one panel opening.

* * * * *